(12) United States Patent
Matsumoto et al.

(10) Patent No.: US 7,125,590 B2
(45) Date of Patent: *Oct. 24, 2006

(54) LIQUID CRYSTAL FILM AND LIQUID CRYSTAL DISPLAY DEVICE EQUIPPED WITH SAME

(75) Inventors: Takuya Matsumoto, Yokohama (JP); Hitoshi Mazaki, Yokohama (JP); Toru Nakamura, Yokohama (JP); Takashi Seki, Yokohama (JP)

(73) Assignee: Nippon Oil Corporation (JP)

( * ) Notice: Subject to any disclaimer, the term of this patent is extended or adjusted under 35 U.S.C. 154(b) by 38 days.

This patent is subject to a terminal disclaimer.

(21) Appl. No.: 10/825,557

(22) Filed: Apr. 14, 2004

(65) Prior Publication Data

US 2004/0209006 A1    Oct. 21, 2004

(30) Foreign Application Priority Data

Apr. 18, 2003   (JP)   ............................. 2003-114322

(51) Int. Cl.
C09K 19/38   (2006.01)
C09K 19/34   (2006.01)
C09K 19/20   (2006.01)
G02F 1/13363  (2006.01)

(52) U.S. Cl. ................... 428/1.3; 428/1.1; 252/299; 252/299.67; 349/88; 349/183; 528/417; 549/510

(58) Field of Classification Search ................ 428/1.1, 428/1.3; 252/299.61, 299.67; 349/88, 183–186; 528/417; 549/510

See application file for complete search history.

(56) References Cited

U.S. PATENT DOCUMENTS 5,147,682 A    9/1992   Takiguchi et al. ............ 427/58
5,193,020 A    3/1993   Shiozaki et al. ............... 359/73
5,296,528 A *  3/1994   Lutjens et al. ............... 524/513
5,413,657 A    5/1995   Yamanashi et al. ......... 156/235
5,863,457 A    1/1999   Hasebe et al. ......... 252/299.01
6,015,914 A *  1/2000   Sasaki et al. ................ 549/510

(Continued)

FOREIGN PATENT DOCUMENTS

EP   1405850   4/2004

(Continued)

Primary Examiner—Harold Pyon
Assistant Examiner—Sow-Fun Hon
(74) Attorney, Agent, or Firm—Adams & Wilks

(57) ABSTRACT

Liquid crystal films with excellent heat resistance and mechanical strength are provided.

A liquid crystal film is obtained by fixing an aligned liquid crystal material containing at least a side chain-type polymeric liquid crystalline substance obtained by homopolymerizing the (meth)acrylic portion of a (meth)acrylic compound having an oxetanyl group represented by formula (1) below or copolymerizing the same with another (meth)acrylic compound and a difunctional low molecular weight liquid crystalline substance having two oxetanyl groups represented by formula (2):

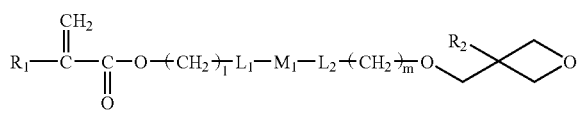

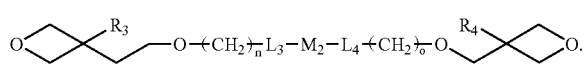

10 Claims, 10 Drawing Sheets

U.S. PATENT DOCUMENTS

| | | | |
|---|---|---|---|
| 6,338,808 B1 * | 1/2002 | Kawata et al. | 252/299.4 |
| 6,660,344 B1 * | 12/2003 | Lub | 428/1.1 |
| 6,726,966 B1 * | 4/2004 | Negoro et al. | 428/1.23 |
| 6,875,483 B1 * | 4/2005 | Ichihashi et al. | 428/1.23 |
| 6,894,141 B1 * | 5/2005 | Satoh et al. | 528/196 |
| 6,953,862 B1 * | 10/2005 | Musa | 549/510 |
| 2005/0082513 A1 * | 4/2005 | Seki et al. | 252/299.01 |
| 2005/0224757 A1 * | 10/2005 | Syundo et al. | 252/299.61 |

FOREIGN PATENT DOCUMENTS

| | | |
|---|---|---|
| JP | 10120640 | 5/1998 |
| JP | 00319527 | 11/2000 |
| JP | 1469058 A1 * | 10/2004 |
| WO | 0228985 | 4/2002 |

* cited by examiner

LIQUID CRYSTAL FILM AND LIQUID CRYSTAL DISPLAY DEVICE EQUIPPED WITH SAME

BACKGROUND OF THE INVENTION

1. Field of the Invention

The present invention relates to a liquid crystal film and a liquid crystal display device equipped with such a liquid crystal film.

2. Description of the Prior Art

In recent years, as a result of the research development which has been actively conducted to apply liquid crystal materials for optical purposes, a liquid crystal film produced by aligning a liquid crystal material and forming the material into a film has been practically used for the purposes of compensating color and widening a viewing angle of a liquid crystal display device.

Various methods of forming a liquid crystal material into a film are known. For example, there is a method in which a liquid crystal film is produced by forming a thin film of a polymeric liquid crystalline substance over a substrate with alignability and then heating the film to a temperature equal to or higher than the glass transition temperature "Tg" so as to align the liquid crystal (liquid crystal molecules), followed by quenching the film so as to fix the aligned liquid crystal, as disclosed in Japanese Laid-Open Patent Publication No. 3-9321. However, although this method is applicable to both main chain- and side chain-type polymeric liquid crystalline substances, it has problems that the process would be increased in load and eligible alignment substrates are limited because the temperature at which the liquid crystallinity is exhibited rises when using a main chain-type polymeric liquid crystalline substance with a high Tg. Furthermore, when using a side chain-type polymeric liquid crystalline substance, this method has a problem in the heat resistance of the resulting liquid crystal film and a disadvantage that the orientation of the liquid crystal would be disordered at a temperature in the vicinity of the Tg.

Alternatively, there is a method in which a liquid crystal film is produced by sealing a liquid crystalline low molecular weight substance having a reactive group into a liquid crystal cell provided with an alignment substrate and heating the cell to a temperature at which the substance exhibits a liquid crystallinity so as to be aligned, followed by fixing the aligned liquid crystal by polymerization with an external stimulus such as light or heat, as disclosed in Japanese Laid-Open Patent Publication No. 8-21915. However, in this method, it is difficult to control the parameters of the resulting liquid crystal film because the liquid crystal to be aligned is a low molecular weight substance and thus the physical properties such as fluidity and birefringence are heavily dependent on temperature. Further, this method may often have a problem in the heat resistance of the resulting liquid crystal film because the liquid crystal after polymerization becomes similar in structure to a side chain-type polymeric liquid crystalline substance and thus fails to raise the Tg sufficiently.

As an alternative for fixing a liquid crystal orientation by polymerization with an external stimulus, there is a method in which a mixture of a polymeric liquid crystalline substance and a reactive low molecular weight substance is aligned and reacted, i.e., cured with an external stimulus, as disclosed in Japanese Laid-Open Patent Publication No. 10-120640. However, because the reaction between the polymeric liquid crystalline substance and the reactive low molecular weight substance does not progress sufficiently, the Tg is not sufficiently raised, leading to a problem in the heat resistance of the resulting liquid crystal film.

In view of these problems, it can be said that a method disclosed in Japanese Laid-Open Patent Publication No. 2000-319527 is the most effective in which method a reactive group is directly introduced into a polymeric liquid crystalline substance with a relatively low Tg, such as a side chain-type one and then cross-linked with an external stimulus such as light or heat after aligning the reactive group in a liquid crystal state, thereby raising the Tg. However, this method has a problem that it is difficult to synthesize such a side chain-type polymeric liquid crystalline substance with a reactive group. For example, when the polymeric structure is constructed prior to the introduction of a reactive group, the amount thereof is prone to be insufficient. On the other hand, in a method in which a side chain-type polymeric liquid crystalline substance having a reactive group is synthesized from a monomer having two reactive groups by polymerizing one of the reactive groups, it is necessary that the reactivity of the other reactive group must be maintained lower than that of the reactive group to be reacted, leading to a problem that the reaction of the reactive group after aligning the reaction group in a liquid crystal state is prone to be insufficient.

Furthermore, in the case of using only a side chain-type polymeric liquid crystalline substance, it may be difficult to shift the reactive region during a cross-linking reaction and thus there arises a problem that the cross-linking does not progress sufficiently.

The present invention provides a liquid crystal film with an excellent heat resistance, which can solve the above-described problems and a liquid crystal display device mounted with such a liquid crystal film.

The present invention was made in view of the forgoing problems and provides a liquid crystal film with an excellent heat resistance, and which is produced by fixing an aligned liquid crystal material containing a side chain-type polymeric liquid crystalline substance obtained by polymerizing a novel compound having reactive groups with excellent reactivity for fixing the aligned liquid crystal structure and a difunctional low molecular weight liquid crystalline substance having two or more such reactive groups.

SUMMARY OF THE INVENTION

That is, according to a first aspect of the present invention, there is provided a liquid crystal film obtained by fixing an aligned liquid crystal material containing at least a side chain-type polymeric liquid crystalline substance obtained by homopolymerizing the (meth)acrylic portion of a (meth)acrylic compound having an oxetanyl group represented by formula (1) below or copolymerizing the same with another (meth)acrylic compound and a difunctional low molecular weight liquid crystalline substance having two oxetanyl groups represented by formula (2):

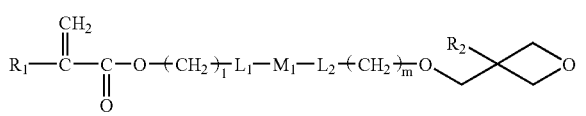

-continued

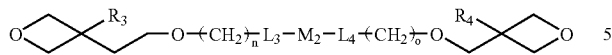
(2)

wherein R₁ is hydrogen or methyl; R₂, R₃, and R₄ are each independently selected from the group consisting of hydrogen, methyl, and ethyl; L₁, L₂, L₃, and L₄ are each independently selected from the group consisting of a single bond, —O—, —O—CO—, and —CO—O—; M₁ and M₂ are each independently represented by a formula selected from the group consisting of formulas (3), (4) and (5) below; and l, m, n, and o are each independently an integer from 0 to 10:

—P₁-L₅-P₂-L₆-P₃—   (3)

—P₁-L₅-P₃—   (4)

—P₃—   (5)

wherein P₁ and P₂ are each independently a group selected from the group consisting of formulas (6) below, P₃ is a group selected from the group consisting of formulas (7) below, and L₅ and L₆ are each independently selected from the group consisting of a single bond, —CH=CH—, —C≡C—, —O—, —O—CO—, and —CO—O—:

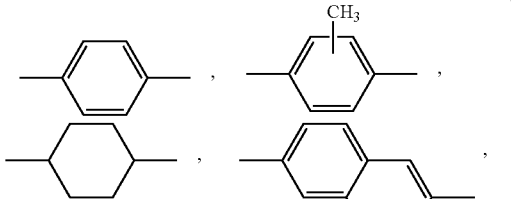
(6)

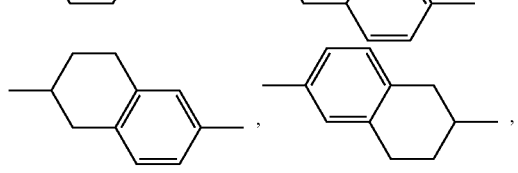

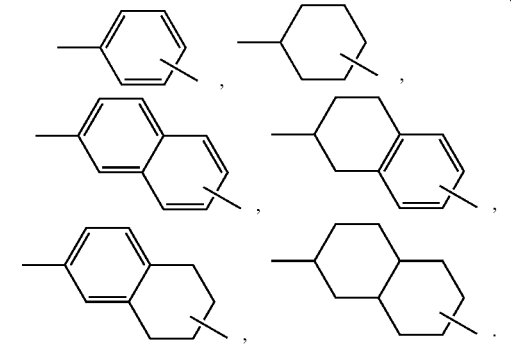
(7)

According to a second aspect of the present invention, there is provided the liquid crystal film of the first aspect wherein the side chain-type polymeric liquid crystalline substance contains a unit represented by formula (8) below in an amount of 5 to 100 percent by mol:

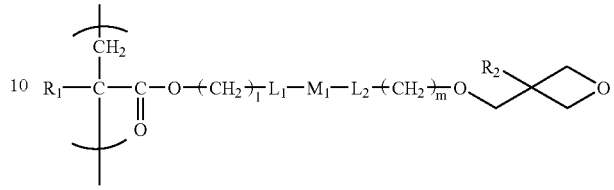
(8)

According to a third aspect of the present invention, there is provided the liquid crystal film of the first aspect wherein the weight-average molecular weight of the side chain-type polymeric liquid crystalline substance is from 2,000 to 100,000.

According to a forth aspect of the present invention, there is provided the liquid crystal film of the first aspect wherein the liquid crystal material contains the side chain-type polymeric liquid crystalline substance in an amount of at least 10 percent by mass or more and the difunctional low molecular weight liquid crystalline substance in an amount of at least 5 percent by mass or more.

According to a fifth aspect of the present invention, there is provided the liquid crystal film of the first aspect wherein the liquid crystal material contains a photo-cation generator and/or a thermal-cation generator.

According to a sixth aspect of the present invention, there is provided the liquid crystal film of the first aspect wherein the film is one obtained by developing the liquid crystal material over an alignment substrate so as to be aligned and fixing the liquid crystal material in the aligned state by irradiation with light and/or a heat treatment.

According to a seventh aspect of the present invention, there is provided the liquid crystal film of the first aspect wherein the liquid crystal material is fixed in an aligned structure selected from the group consisting of nematic, nematic hybrid, and smectic orientations.

According to an eighth aspect of the present invention, there is provided an optical film comprising the liquid crystal film of the first aspect.

According to a ninth aspect of the present invention, there is provided the optical film of the eighth aspect which is a film selected from the group consisting of a λ/2 film, a λ/4 film, a color compensation film, a retardation film, and a viewing angle improving film.

According to a tenth aspect of the present invention, there is provided a liquid crystal display device which is equipped with the optical film of the eighth or ninth aspect.

DETAILED DESCRIPTION OF THE PREFERRED EMBODIMENTS

Figure 1:
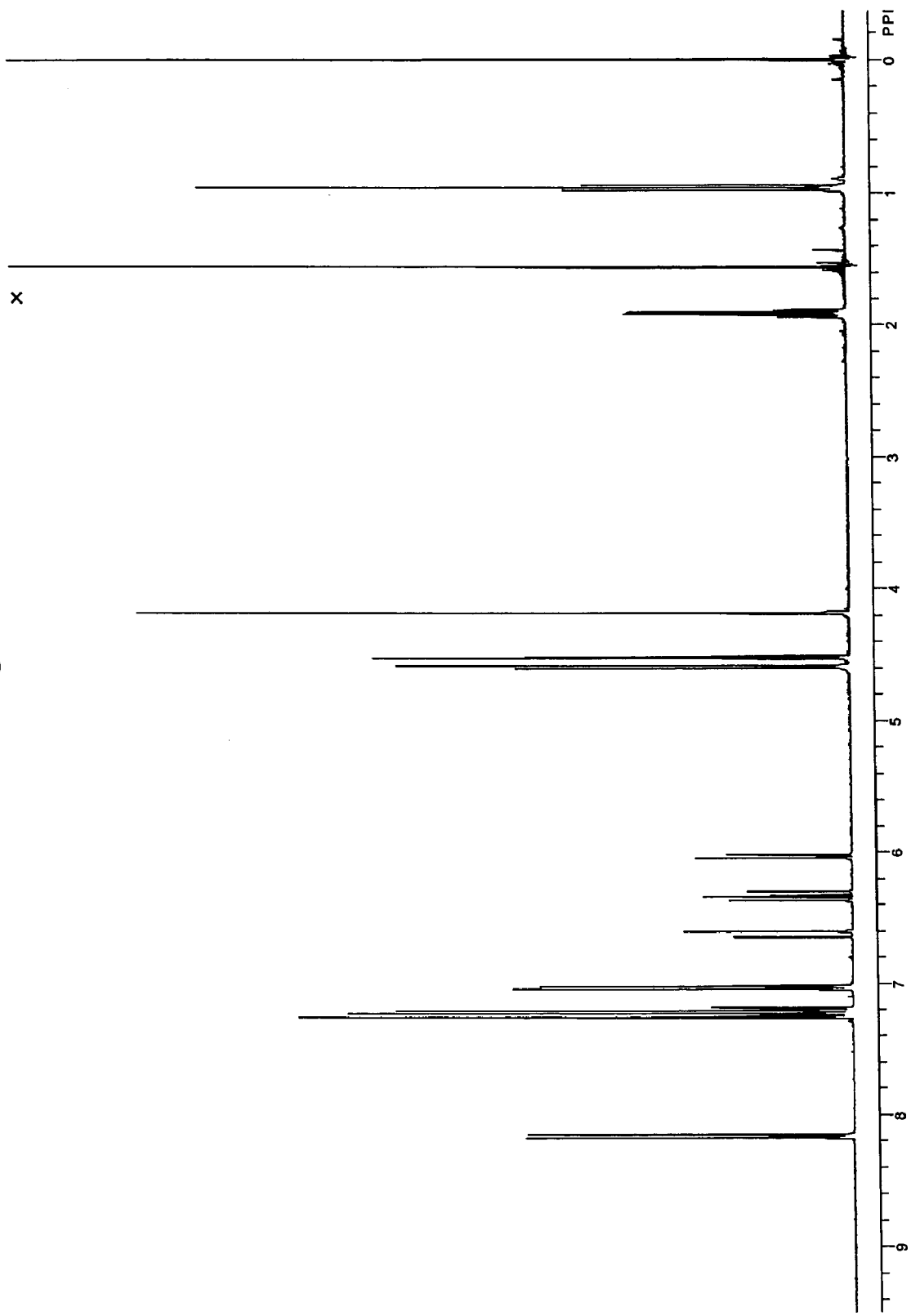
FIG. 1 shows the ¹H-NMR spectrum of acrylic compound 1 obtained in Reference Example 1.

The present invention will be described in more details below.

The present invention provides a liquid crystal film obtained by fixing an aligned liquid crystal material containing at least a side chain-type polymeric liquid crystalline substance obtained by homopolymerizing the (meth)acrylic portion of a (meth)acrylic compound having an oxetanyl group represented by formula (1) below or copolymerizing the same with another (meth)acrylic compound and a difunctional low molecular weight liquid crystalline substance having two oxetanyl groups represented by formula (2):

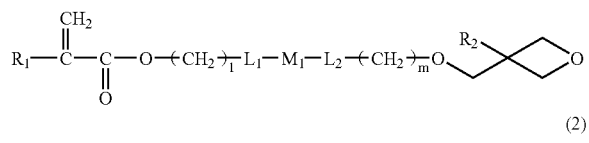

(1)

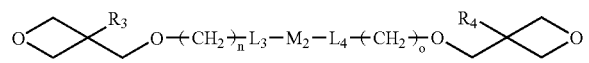

(2)

wherein $R_1$ is hydrogen or methyl; $R_2$, $R_3$, and $R_4$ are each independently selected from the group consisting of hydrogen, methyl, and ethyl; $L_1$, $L_2$, $L_3$, and $L_4$ are each independently selected from the group consisting of a single bond, —O—, —O—CO—, and —CO—O—; $M_1$ and $M_2$ are each independently represented by a formula selected from the group consisting of formulas (3), (4) and (5) below; and l, m, n, and o are each independently an integer from 0 to 10:

 (3)

 (4)

 (5)

wherein $P_1$ and $P_2$ are each independently a group selected from the group consisting of formulas (6) below; $P_3$ is a group selected from the group consisting of formulas (7) below; and $L_5$ and $L_6$ are each independently selected from the group consisting of a single bond, —CH=CH—, —C≡C—, —O—, —O—CO— and —CO—O—:

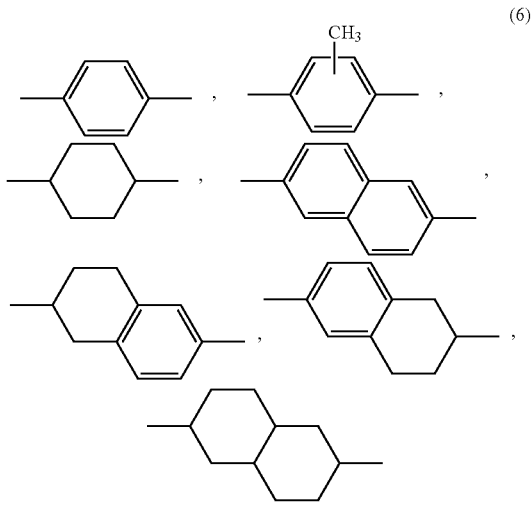

(6)

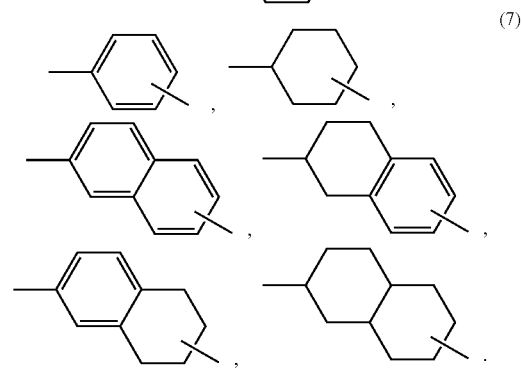

(7)

The (meth)acrylic compound having an oxetanyl group used in the present invention is characterized in that it contains a mesogen portion comprising an aromatic ester; spacer portions bonding thereto and comprising a hydrocarbon chain; a reactive oxetanyl group at one terminal end; and a (meth)acrylic group at the other terminal end, as constituting units and a polymeric substance obtained by homopolymerizing the (meth)acrylic group of this compound or copolymerizing the same with another (meth)acrylic compound exhibits liquid crystallinity.

First of all, each of the constituting units will be described.

The mesogen portion of the (meth)acrylic compound having an oxetanyl group of the present invention is represented by "-$L_1$-$M_1$-$L_2$-" in formula (1) wherein $M_1$ is represented by "—$P_1$-$L_5$-$P_2$-$L_6$-$P_3$—", "—$P_1$-$L_5$-$P_3$—", or "—$P_3$—". The mesogen portion has such a structure that 1 to 3 aromatic- or cyclohexane-rings bond directly (single bond) or via an ether bond (—O—) or an ester bond (—CO—O—) to the spacer portion, oxetanyl group or (meth)acrylic group.

In formulas (1), (3), (4), and (5), $L_1$ and $L_2$ are each independently a single bond (i.e. the groups at the both sides bond directly without via the group represented by "L"), —O—, —O—CO—, or —CO—O—, and $L_5$ and $L_6$ are each independently a single bond (i.e., the groups at the both sides bond directly without via the group represented by "L"), —CH=CH—, —C≡C—, —O—, —O—CO—, or —CO—O—. $P_1$ and $P_2$ are each independently a group selected from formulas (6) mentioned above, while $P_3$ is a group selected from formulas (7) mentioned above.

Although the mesogen portion may be selected arbitrarily from the above-described combinations, preferred examples include those represented by the following formulas:

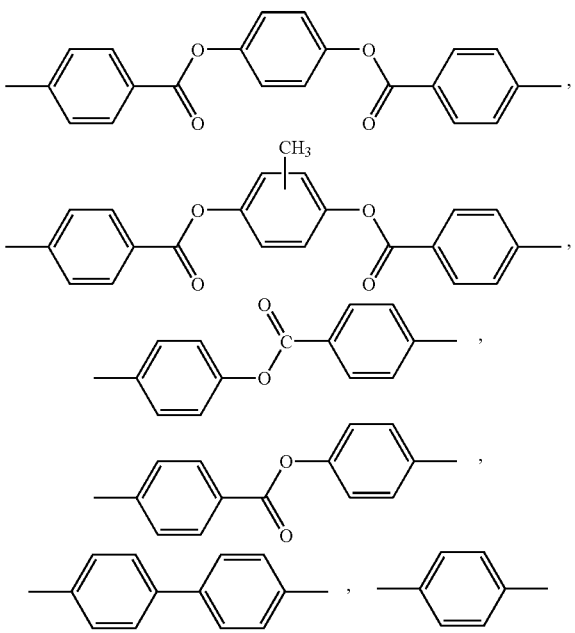

The spacer portions represented by "—(CH$_2$)$_l$—" and "—(CH$_2$)$_m$—" in formula (1) each represent a single bond which means that "l" or "m" is 0 or a divalent straight-chain hydrocarbon group having 1 to 10 carbon atoms, i.e., "l" or "m" is an integer of 1 to 10. As long as the intended compound exhibits liquid crystallinity, the mesogen portion may bond directly without via the spacer portions or bond via an ether bond (—O—) or an ester bond (—CO—O—), to the oxetanyl group portion and the (meth)acrylic portion. In general, too short spacers between the mesogen portion and the (meth)acrylic group portion would narrow the temperature range at which the liquid crystallinity is exhibited, while too long spacers would adversely affect the heat resistance of the resulting liquid crystal film. In view of these, the spacer portions between the mesogen portion and the (meth)acrylic group portion have usually 1 to 8, preferably 2 to 6 carbon atoms. Too long spacers between the mesogen portion and the oxetanyl group portion would adversely affect the heat resistance of the resulting liquid crystal film. Therefore, the carbon number of the spacer portions between the mesogen portion and the oxetanyl group portion is usually 0 to 6, preferably 0 to 4. The term "0 carbon number" denotes herein that the mesogen portion bonds directly to the oxetanyl group portion.

One of the terminal ends of the (meth)acrylic compound having an oxetanyl group, of the present invention is a reactive oxetanyl group, while the other terminal end is a (meth)acrylic group. Since the compound is a difunctional monomer having both an oxetanyl group which is a cationic polymerizable group and a (meth)acrylic group which is a radical- or anionic-polymerizable group, only the (meth)acrylic group can be polymerized by radical- or anionic-polymerization, thereby obtaining a side chain-type polymeric liquid crystalline substance having an oxetanyl group which is a cationic polymerizable group. That is, a side chain-type polymeric liquid crystalline compound is synthesized by anionic- or radical-polymerization of the (meth)acrylic group in the presence of the cationic polymerizable oxetanyl group whose reactivity is low under the conditions except those for cationic polymerization. A side chain-type polymeric liquid crystalline compound is lower in Tg than a main chain-type liquid crystalline polymer and thus can be easily aligned at a low temperature. After the side chain-type polymeric liquid crystalline compound thus obtained is aligned, the oxetanyl group is polymerized, i.e., cured and cross-linked in the presence of cations, thereby raising the Tg and thus producing a liquid crystal film with improved heat resistance and mechanical strength.

No particular limitation is imposed on the method of synthesizing the (meth)acrylic compound having an oxetanyl group which can, therefore, be synthesized using any of conventional organic synthesis methods.

For example, a portion having an oxetanyl group is coupled to a portion having a (meth)acrylic group by means of the Williamson's ether synthesis or an ester synthesis using a condensing agent thereby synthesizing a (meth)acrylic compound having two reactive functional groups, i.e., an oxetanyl group and a (meth)acrylic group.

More specifically, the (meth)acrylic compound having an oxetanyl group of the present invention can be synthesized by the following processes:

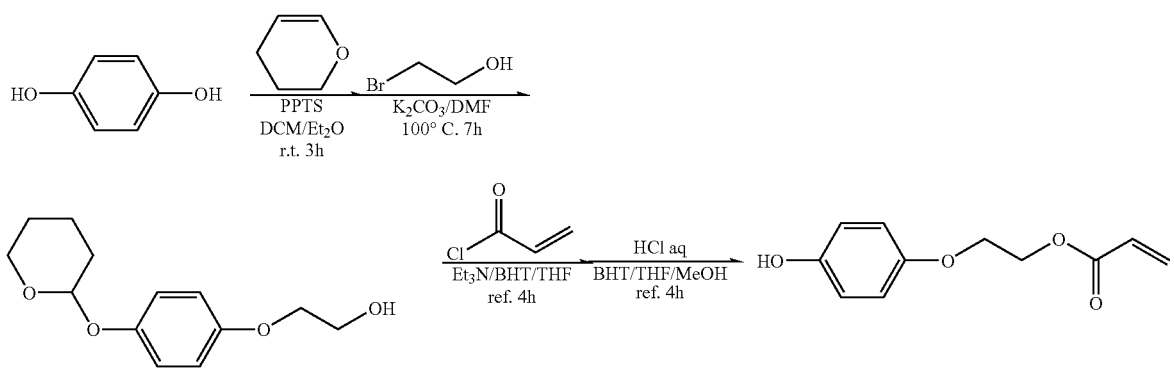

-continued

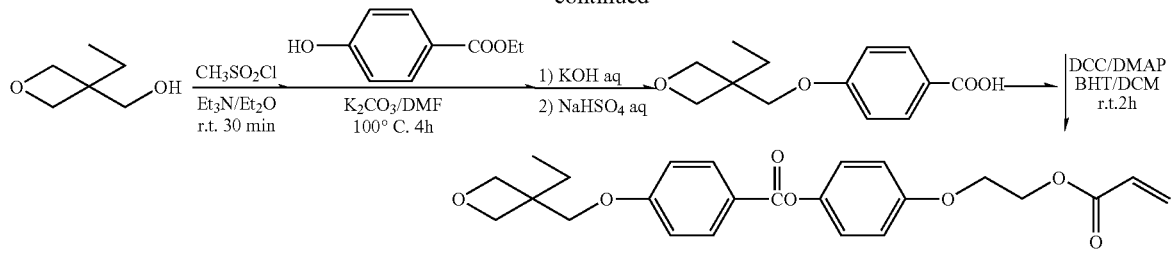

The abbreviations in the above formulas indicate the following compounds:
DCC: 1,3-dicyclohexylcarbodiimide
DMAP: (dimethylamino)pyridine
DCM: dichloromethane
PPTS: pyridinium-p-toluene sulfonate
THF: tetrahydrofuran
DMF: dimethylformamide
BHT: 2,6-di-t-butyl-4-methylphenol A side chain-type polymeric liquid crystalline compound containing a unit represented by formula (8) below is obtained by homopolymerizing the (meth)acrylic group of a (meth)acrylic compound having an oxetanyl group represented by formula (1) or copolymerizing the same with another (meth)acrylic compound:

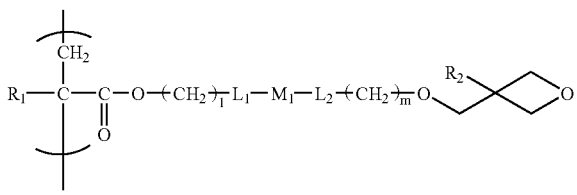

(8)

The side chain-type polymeric liquid crystalline compound containing a unit represented by formula (8) can be easily synthesized by homopolymerizing the (meth)acrylic group portion of the (meth)acrylic compound having an oxetanyl group of formula (1) alone or copolymerizing the same with another (meth)acrylic compound by way of radical or anionic polymerization. No particular limitation is imposed on the polymerization conditions. Therefore, the polymerization may be carried out under normal conditions.

As an example of the radical polymerization, a method may be used in which a (meth)acrylic compound of formula (1) and another (meth)acrylic compound for copolymerization used if necessary are dissolved in a solvent such as dimethylformamide (DMF) and reacted at a temperature of 60 to 110° C. for several hours using 2,2'-azobisisobutyronitrile (AIBN) or benzoyl peroxide (BPO) as an initiator. Alternatively, there is also an effective method in which in order to allow a liquid crystal phase to be stably exhibited, a living radical polymerization is conducted using a copper (I) bromide/2,2'-bipyridyl-based or TEMPO-based initiator so as to control the molecular weight distribution. It is necessary to conduct these radical polymerizations strictly under deoxidation conditions.

As an example of the anionic polymerization, a method may be used in which a (meth)acrylic compound of formula (1) and another (meth)acrylic compound for copolymerization used if necessary are dissolved in a solvent such as tetrahydrofuran (THF) and reacted using a strong base such as organic lithium compounds, organic sodium compounds or a Grignard reagent as an initiator. Alternatively, this polymerization can be converted to a living anionic polymerization by optimizing the initiator or reaction temperature thereby controlling the molecular weight distribution. It is necessary to conduct these anionic polymerizations strictly under dehydration and deoxidation conditions.

No particular limitation is imposed on the type of a (meth)acrylic compound to be copolymerized as long as the synthesized polymeric substance exhibits liquid crystallinity. However, preferred are (meth)acrylic compounds having a mesogen group because they can enhance the liquid crystallinity of the resulting polymeric substance. More specifically, particularly preferred are those as represented by the following formulas:

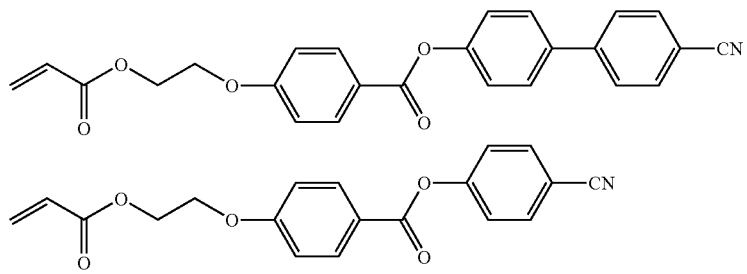

The side chain-type polymeric liquid crystalline substance of the present invention contains a unit of formula (8) in an amount of preferably 5 to 100 percent by mol and particularly preferably 10 to 100 percent by mol. The side chain-type polymeric liquid crystalline substance of the present invention has a weight average molecular weight of preferably 2,000 to 100,000 and particularly preferably 5,000 to 30,000.

The difunctional low molecular weight liquid crystalline substance having two oxetanyl groups used in the present invention is characterized in that it contains a mesogen portion comprising an aromatic ester; spacer portions each comprising a hydrocarbon chain bonding to the mesogen portion as the case may be; and reactive oxetanyl groups at both of the terminal ends and exhibits liquid crystallinity.

First of all, each of the constituting units will be described.

The mesogen portion of the difunctional low molecular weight liquid crystalline substance having two oxetanyl groups is represented by "-$M_2$-" in formula (2) wherein $M_2$ is represented by "—$P_1$-$L_5$-$P_2$-$L_6$-$P_3$—", "—$P_1$-$L_5$-$P_3$—", or "—$P_3$—". The mesogen portion has such a structure that 1 to 3 aromatic- or cyclohexane-rings bond directly (single bond) or via an ether bond (—O—) or an ester bond (—CO—O—) to the spacer portions or the oxetanyl groups.

In formulas (2), (3), (4), and (5), $L_3$ and $L_4$ are each independently a single bond (i.e. the groups at the both sides bond directly without via the group represented by "L"), —O—, —O—CO—, or —CO—O—, and $L_5$ and $L_6$ are each independently a single bond (i.e., the groups at the both sides bond directly without via the group represented by "L"), —CH=CH—, —C≡C—, —O—, —O—CO— or —CO—O—. $P_1$ and $P_2$ are each independently a group selected from formulas (6) mentioned above, while $P_3$ is a group selected from formulas (7) mentioned above.

Although the mesogen portion of the difunctional low molecular weight liquid crystalline substance having two oxetanyl groups used in the present invention may be selected arbitrarily from the above-described combinations, preferred examples include those represented by the following formulas:

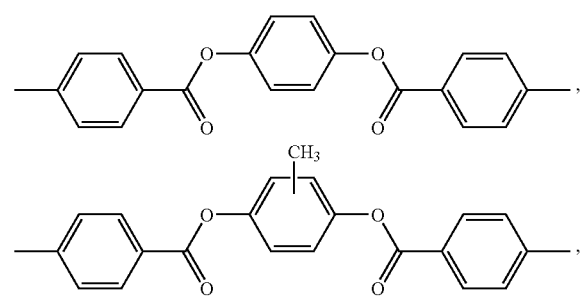

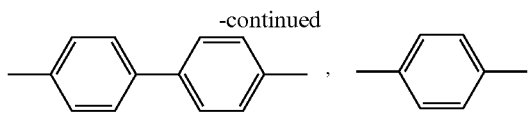

The spacer portions represented by "—$(CH_2)_n$—" and "—$(CH_2)_o$—" in formula (2) each represent a single bond which means that "n" or "o" is 0 or a divalent straight-chain hydrocarbon group having 1 to 10 carbon atoms, i.e., "n" or "o" is an integer of 1 to 10. As long as the intended compound exhibits liquid crystallinity, the mesogen portion may bond directly without via the spacer portions or bond via an ether bond (—O—) or an ester bond (—CO—O—), to the oxetanyl group portions. In general, too short spacers between the mesogen portion and the oxetanyl group portions would narrow the temperature range at which the liquid crystallinity is exhibited, while too long spacers would adversely affect the heat resistance of the resulting liquid crystal film. In view of these, the carbon number of the spacer portions between the mesogen portion and the oxetanyl group portions is usually 0 to 8, preferably 2 to 6. The term "0 carbon number" denotes herein that the mesogen portion bonds directly to the oxetanyl group portions.

Both of the terminal ends of the difunctional low molecular weight liquid crystalline compound having two oxetanyl groups used in the present invention are reactive oxetanyl groups which are cationic polymerizable groups. These oxetanyl groups can be reacted (cross-linked) with the oxetanyl group of the above-described side chain-type liquid crystalline polymer upon formation of a film. The difunctional low molecular weight liquid crystalline substance is higher in reactivity than the polymer due to its low molecular weight. Therefore, the use of the difunctional low molecular weight liquid crystalline substance can increase the cross-linking density and enhance the heat resistance and mechanical strength of the resulting film.

No particular limitation is imposed on the method of synthesizing the difunctional low molecular weight liquid crystalline substance having two oxetanyl groups which can, therefore, be synthesized using any of conventional organic synthesis methods.

For example, portions having an oxetanyl group are coupled to a mesogen portion by means of the Williamson's ether synthesis or an ester synthesis using a condensing agent thereby synthesizing a difunctional low molecular weight liquid crystalline substance having two oxetanyl groups.

More specifically, the difunctional low molecular weight liquid crystalline substance having two oxetanyl groups can be synthesized by the following processes:

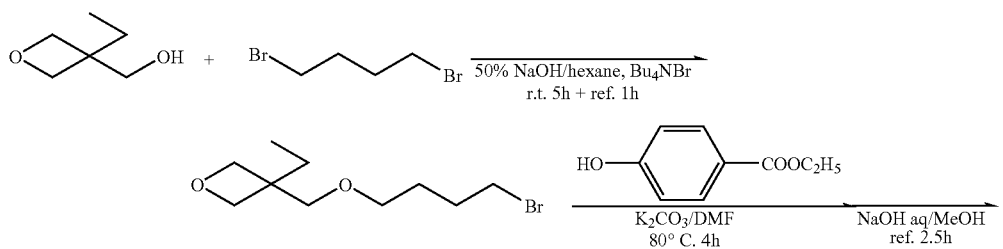

-continued

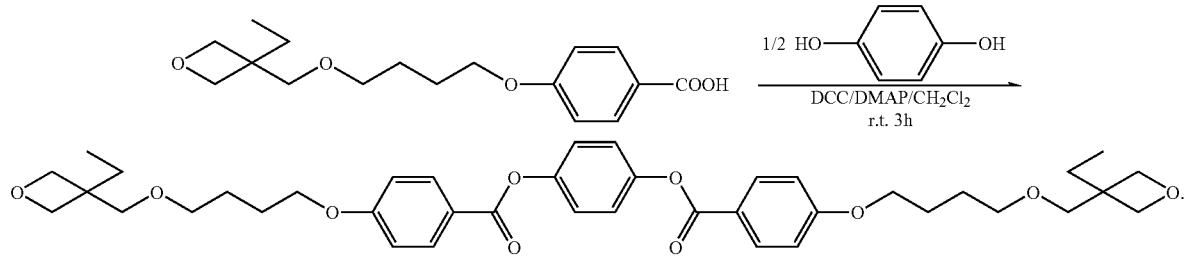

The abbreviations in the above formulas indicate the following compounds:
DCC: 1,3-dicyclohexylcarbodiimide
DMAP: (dimethylamino)pyridine.

Next, described will be a liquid crystal material containing the side chain-type polymeric liquid crystalline substance and the difunctional low molecular weight liquid crystalline substance.

The liquid crystal material used in the present invention contains the above-described side chain-type polymeric liquid crystalline substance in an amount of at least 10 percent by mass or more, preferably 30 percent by mass or more, and more preferably 50 percent by mass or more and the above-described difunctional low molecular weight substance in an amount of at least 5 percent by mass or more, preferably 10 percent by mass or more, and more preferably 15 percent by mass or more. The side chain-type polymeric liquid crystalline substance in an amount of less than 10 percent by mass or the difunctional low molecular weight liquid crystalline substance in an amount of less than 5 percent by mass would decrease the polymerizable group concentration in the composition or the concentration of the difunctional low molecular weight liquid crystalline substance, leading to insufficient mechanical strength of the resulting liquid crystal film after polymerization.

Other than the side chain-type polymeric liquid crystalline substance, the liquid crystal material used in the present invention may contain various compounds which can be mixed without impairing the liquid crystallinity. Examples of such compounds include those having a cationic polymerizable functional group such as oxetanyl, epoxy, and vinylether groups; various polymeric substances having a film forming capability; and various low molecular- or polymeric-liquid crystalline compounds exhibiting a nematic-, cholesteric-, or discotic liquid crystallinity.

After the liquid crystal material is subjected to an aligning treatment, it is fixed in a liquid crystal state by cationic polymerization of the oxetanyl group so as to be cross-linked by thereby improving the heat resistance of the resulting liquid crystal film. Therefore, in order to allow the cationic polymerization to progress easily and rapidly, the liquid crystal material preferably contains a photo- or thermal-cation generator which generates cations with an external stimulus such as light or heat. If necessary, various sensitizers may be used in combination.

The term "photo-cation generator" used herein denotes a compound which can generate cations by irradiation of a light with a specific wavelength and may be an organic sulfonium salt-, iodonium salt-, or phosphonium salt-based compound. Counter ions of these compounds are preferably antimonate, phosphate, and borate. Specific examples include $Ar_3S^+SbF_6^-$, $Ar_3P^+BF_4^-$, and $Ar_2I^+PF_6^-$ wherein Ar indicates a phenyl or substituted phenyl group. Sulfonic acid esters, triazines, diazomethanes, β-ketosulfone, iminosulfonate, and benzoinsulfonate may also be used.

The term "sensitizer" used herein denotes a compound which can activate a photo cation generator with an energy shift after the compound is photo-excited by irradiation with a light of an appropriate wavelength. Examples of the sensitizer include phenothiazine, anthracene, pyrene, benzophenone, thioxanthone, fluorenone, and anthraquinone. These sensitizers can generate cations efficiently with a less light irradiation dose when used in combination with a photo cation generator.

The term "thermal cation generator" used herein denotes a compound which can generate cations by heating to a certain temperature. Examples of the thermal cation generator include benzylsulfonium salts, benzylammonium salts, benzylpyridinium salts, benzylphosphonium salts, hydradinium salts, carbonic acid esters, sulfonic acid esters, amineimides, antimony pentachloride-acetyl chloride complexes, diaryliodonium salt-dibenzyloxy copper, and halogenated boron-tertiary amine adducts.

Since the amount of the cation generator to be added in the liquid crystal material varies depending on the structure of the mesogen portion or spacer portions constituting the side chain-type polymeric liquid crystalline substance to be used; the equivalent weight of the oxetanyl group; and the conditions for aligning the liquid crystal or affects the phase behavior of the liquid crystal composition, it can not be determined with certainty. However, the amount of the cation generator is within the range of usually 100 ppm by mass to 20 percent by mass, preferably 1,000 ppm by mass to 10 percent by mass, more preferably 0.2 percent by mass to 7 percent by mass, and most preferably 0.5 percent by mass to 5 percent by mass. The cation generator of less than 100 ppm by mass is not preferred because polymerization may not progress due to the insufficient amount of cations to be generated. The cation generator of more than 20 percent by mass is not also preferred because a large amount of the decomposed residuals of the cation generator remains in the resulting liquid crystal film and thus the light resistance thereof would be deteriorated.

When the liquid crystal material containing such components is considered as the whole, it must possess a liquid crystal phase, desirously nematic phase and maintain the orientation state at the time of cross-linking.

Next, described will be hereinafter the method of producing a liquid crystal film using a liquid crystal material (polymeric liquid crystalline composition). Although not restricted, the liquid crystal film may be produced by developing the liquid crystal material over an alignment substrate so as to be aligned and fixing the material in the aligned state by irradiation with light and/or a heat treatment.

First of all, the liquid crystal material of the present invention is developed and aligned over an alignment substrate. Examples of the alignment substrate are films of such as polyimide, polyphenylene sulfide, polyphenylene oxide, polyether ketone, polyethylene naphthalate, polyethylene terephthalate, polyarylate, and triacetyl cellulose. Although some of these films exhibit a sufficient capability to align the liquid crystal material and thus can be used as alignment substrates as they are, most of them are used after subjected to a treatment such as rubbing, stretching, polarization irradiation, or skew ray irradiation such that the films exhibit or are enhanced in alignability. Alternatively, a conventional alignment film such as polyimide, polyvinyl alcohol, or polyvinyl cinnamate may be laminated over the substrate film and subjected to a treatment such as rubbing, stretching, polarization irradiation, or skew ray irradiation so as to be able to exhibit alignability.

In the case where there are problems that the alignment substrate to be used is not optically isotropic, the resulting liquid crystal film is opaque at a wavelength region where it is intended to be used, or the alignment substrate is so thick that it causes a problem in practical use, the liquid crystal layer may be transferred to an optically isotropic substrate film or a substrate film which is transparent at a wavelength region where the liquid crystal film is intended to be used or to a substrate film temporarily until the liquid crystal film is attached to a liquid crystal cell. The transferring method may be any conventional method. For example, as disclosed in Japanese Patent Laid-Open Publication Nos. 4-57017 and 5-333313, there may be used a method in which after a substrate film for transferring is laminated via a tacky adhesive or adhesive over a liquid crystal layer with an alignment substrate and if necessary a tacky adhesive or adhesive is coated over the other surface, on which the liquid crystal layer is not laminated, of the substrate film for transferring and then cured, only the liquid crystal layer is transferred on the substrate film for transferring by releasing the alignment substrate.

Examples of the substrate film onto which the liquid crystal layer is transferred are a triacetyl cellulose film such as Fujitack (manufactured by Fuji Photo Film Co., Ltd.) and Konicatack (manufactured by Konica Corp.); a transparent film such as TPX film (manufactured by Mitsui Chemical Inc.), Arton film (manufactured by JSR), Zeonex film (manufactured by Nippon Zeon Co., Ltd), andAcryprene film (manufactured by Mitsubishi Rayon Co., Ltd.); and a polyethylene terephthalate film treated with silicone or provided on its surface with a releasable layer. If necessary, the liquid crystal layer may be transferred directly to a polarizing film.

No particular limitation is imposed on the tacky adhesive or adhesive to be used for transferring the liquid crystal layer as long as it is of optical grade. Therefore, there may be used conventional acrylic-, epoxy-, or urethane-based adhesives.

The liquid crystal material is developed on an alignment substrate and formed into a liquid crystal layer by a method in which the liquid crystal material in a molten state is coated directly over an alignment substrate or a method in which a solution of the liquid crystal material is coated over an alignment substrate and dried to remove the solvent.

No particular limitation is imposed on the solvent used for preparing the solution as long as it can dissolve the liquid crystal material of the present invention and be evaporated under appropriate conditions. Preferred examples of the solvent are ketones such as acetone, methylethyl ketone, and isophorone; ether alcohols such as butoxyethyl alcohol, hexyloxyethyl alcohol, and methoxy-2-propanol; glycol ethers such as ethylene glycol dimethyl ether and diethylene glycol dimethyl ether; esters such as ethyl acetate and ethyl lactate; phenols such as phenol and chlorophenol; amides such as N,N-dimethylformamide, N,N-dimethylacetoamide, and N-methylpyrrolidone; halogen-based solvents such as chloroform, tetrachloroethane, and dichlorobenzene; and mixtures thereof. A surfactant, a defoaming agent, or a leveling agent may be added to the solution so as to form a uniform layer on an alignment substrate.

No particular limitation is imposed on the method of coating the liquid crystal material directly or the solution thereof as long as it can ensure the uniformity of the layer. Therefore, there may be used any conventional method. Examples of the method include spin coating, die coating, curtain coating, dip coating, and roll coating methods.

In the method of coating the liquid crystal material solution, it is preferable to add a drying process for removing the solvent after coating. No particular limitation is imposed on the drying method as long as it can maintain the uniformity of the layer. Therefore, there may be used any conventional method and thus the solvent may be removed in a heater (furnace) or by blowing hot air.

The liquid crystal layer formed on an alignment substrate is subjected to a heat treatment or the like so as to form a liquid crystal orientation and further subjected to light irradiation and/or a heat treatment to fix the orientation. In the first heat treatment, the liquid crystal material is heated to a temperature at which it exhibits a liquid crystal orientation so as to allow the material to be aligned with a self-alignability which the material naturally has. Since the conditions for the heat treatment vary in the optimum conditions and limits depending on the liquid crystal phase behavior temperature (transition temperature) of the liquid crystal material to be used, they can not be determined with certainty. However, the heat treatment is carried out at a temperature within the range of usually 10 to 250° C. and preferably 30 to 160° C. The liquid crystal layer is heated at preferably a temperature equal to or higher than the glass transition temperature and more preferably a temperature which is higher than the glass transition temperature by 10° C. or higher. A too low temperature is not preferred because there is a possibility that aligning of the material does not progress sufficiently, while a too high temperature is not also preferred because the cationic polymerizable reactive group in the liquid crystal material and the alignment substrate are adversely affected. The heat treatment is conducted for usually 3 seconds to 30 minutes and preferably 10 seconds to 10 minutes. The heat treatment for shorter than 3 seconds is not preferred, because there is a possibility that the aligning may not be achieved sufficiently. Whereas the heat treatment for longer than 30 minutes is not also preferred, because the productivity is deteriorated.

After forming the liquid crystal orientation by subjecting the liquid crystal layer to the heat treatment or the like, the liquid crystal material is cured by polymerization of the cationic polymerizable reactive groups in the composition while maintaining the liquid crystal orientation state. This curing process is conducted so as to fix the liquid crystal orientation thus formed by a curing (cross-linking) reaction thereby modifying the layer to be harder.

As described above, since the liquid crystal material of the present invention has a cationic polymerizable reactive groups, it is preferable to use a cationic polymerization initiator (cation generator) for polymerizing (cross-linking) the reactive groups. As such a polymerization initiator, a photo-cation generator is preferred to a thermal-cation generator.

In the case of using a photo-cation generator, after addition thereof, the processes up to the thermal treatment for aligning the liquid crystal material are conducted under such dark conditions (conditions where light is shielded to an extent that the photo-cation generator does not dissociate) that the liquid crystal material does not cure until subjected to the aligning process and thus can be aligned while maintaining sufficient flowability. Thereafter, a light from a light source capable of emitting an appropriate wavelength of light is irradiated so as to allow the photo-cation generator to generate cations thereby curing the liquid crystal material.

The light irradiation is conducted by irradiating a light from a light source having a spectrum in an absorption wavelength region of the photo-cation generator to be used, such as a metal halide lamp, a high-pressure mercury lamp, a low-pressure mercury lamp, a xenon lamp, an arc discharge lamp, and a laser thereby decomposing the photo-cation generator. The irradiation dose per $cm^2$ is within the range of generally 1 to 2,000 mJ and preferably 10 to 1,000 mJ in the integrated irradiation dose. However, when the absorption region of the photo-cation generator is extremely different from the spectrum of the light source, or the liquid crystal material itself can absorb a light in the wavelength of the light source, the irradiation dose is not limited to the above range. In these cases, a method may be employed in which a suitable photo sensitizer or two or more kinds of photo-cation generators having different absorption wavelengths are used.

The temperature at the time of the light irradiation needs to be within the range wherein the liquid crystal material exhibits a liquid crystal orientation. Furthermore, the light irradiation is preferably conducted at a temperature which is equal to or higher than the Tg of the liquid crystal material, in order to enhance the efficiency of the curing sufficiently.

The liquid crystal layer produced through the above-described processes becomes a sufficiently solid and strong film. More specifically, since the three-dimensional bond of the mesogen portion is achieved by the curing reaction, the liquid crystal layer is significantly improved not only in heat-resistance (the upper limit temperature at which the liquid crystal orientation is maintained) but also in mechanical strength such as resistance to scratch, wear, and cracking. The present invention is of great significance in the industrial sense because it can achieve the directly-opposed purposes, i.e., the control of a liquid crystal orientation at ease and the improvements of the thermal/mechanical strength, at the same time.

The liquid crystal layer wherein the aligned liquid crystal is fixed can be used as an optical film in the form in which the layer remains supported on the alignment substrate (alignment substrate/(alignment layer)/liquid crystal layer); in the form in which the film is transferred to a transparent substrate film or the like other than the alignment substrate (transparent substrate film/liquid crystal layer); or in the form of a single layer of the liquid crystal layer.

The liquid crystal orientation state which the liquid crystal layer of the present invention will be able to exhibit can be controlled by properly selecting the structures of the side chain-type polymeric liquid crystalline substance and the other compounds constituting the liquid crystal material. The liquid crystal layer of the present invention can exhibit a nematic orientation, a nematic hybrid orientation, or a smectic orientation and can be formed into an optical film wherein such an orientation is fixed.

The liquid crystal film of the present invention can be used particularly suitably as an optical film and are mounted on various liquid crystal display devices, in the form of λ/2 films, λ/4 films (λ denotes a wave-length of light), color compensation films, optical retardation films, or viewing angle improving films.

The optical films have various applications depending on their orientation structures. The films with a nematic or nematic hybrid orientation are particularly preferably used as optical retardation films and viewing angle improving films.

For example, an optical film wherein a nematic orientation is fixed functions as an optical retardation film which can be used as a compensation plate for an STN-, TN-, OCB-, or HAN-transmissive or reflective type liquid crystal display device. An optical film wherein a smectic orientation is fixed can be used as a diffraction film. An optical film wherein a nematic hybrid orientation is fixed can be used as an optical retardation film or a wavelength plate, utilizing a retardation upon viewing from the front and a viewing angle improving film for a TN-type liquid crystal display device utilizing the asymmetric nature of viewing angle dependency of retardation.

A liquid crystal film with excellent heat resistance and mechanical strength and enhanced hardness can be obtained by fixing an aligned liquid crystal material containing a novel side chain-type polymeric liquid crystalline substance obtained by homopolymerizing the (meth)acrylic portion of a (meth)acrylic compound having an oxetanyl group or copolymerizing the same with another (meth)acrylic compound and a novel difunctional low molecular weight liquid crystalline substance having two or more oxetanyl groups. The liquid crystal film is useful as an optical film for various liquid crystal display devices.

EXAMPLES

The present invention will be further described in the following examples, but the present invention should not be construed as being limited thereto.

The analyzing methods used in the examples are as follows.

(1) $^1$H-NMR Measurement

A compound was dissolved in deuterated chloroform and measured for $^1$H-NMR at 400 MHz using INOVA400 manufactured by Bruker Co., Ltd.

(2) GPC Measurement

The GPC measurement was carried out by dissolving a compound in tetrahydrofuran, using 8020 GPC system manufactured by Tosoh corporation equipped with TSK-GEL Super H1000, Super H2000, Super H3000, and Super H4000 which are connected in series and tetrahydrofuran as an eluent solvent. Polystyrene was used as a standard for calibration of molecular weight.

(3) Observation of Phase Behavior

The liquid crystal phase behavior was observed using an Olympus BH2 polarizing microscope while heating a sample on a Mettler hot stage.

The phase transition temperature was measured using a differential scanning calorimeter DSC7 manufactured by Perkin Elmer Co.

(4) Parameter Measurement of Liquid Crystal Film

The retardation of a nematic orientation was measured using KOBRA manufactured by Oji Keisokuki Co., Ltd.

Reference Example 1

Synthesis of Acrylic Compound 1 Having an Oxetanyl Group

In accordance with the scheme below, an acrylic compound having an oxetanyl group (acrylic compound 1) was synthesized using 3-ethyl-3-hydroxymethyloxetane (OXT-101, manufactured by Toagosei Co., Ltd.).

The $^1$H-NMR spectrum of acrylic compound 1 is shown in FIG. 1.

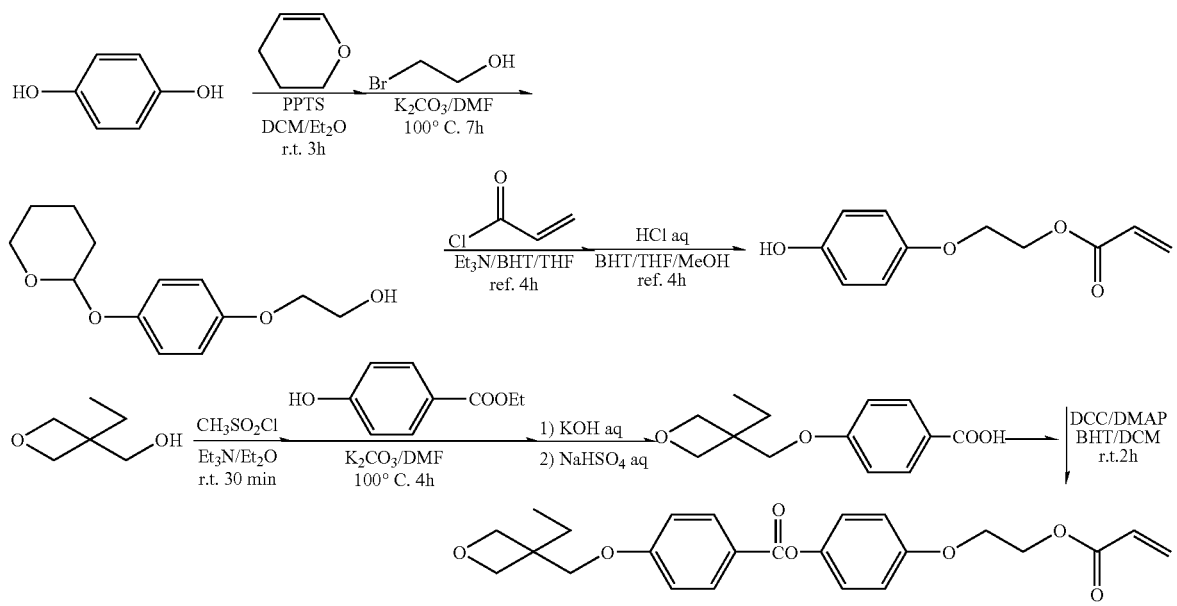

Reference Example 2

Synthesis of Acrylic Compound 2 Having an Oxetanyl Group

In accordance with the scheme below, an acrylic compound having an oxetanyl group (acrylic compound 2) was synthesized using 3-ethyl-3-hydroxymethyloxetane (OXT-101, manufactured by Toagosei Co., Ltd).

Figure 2:
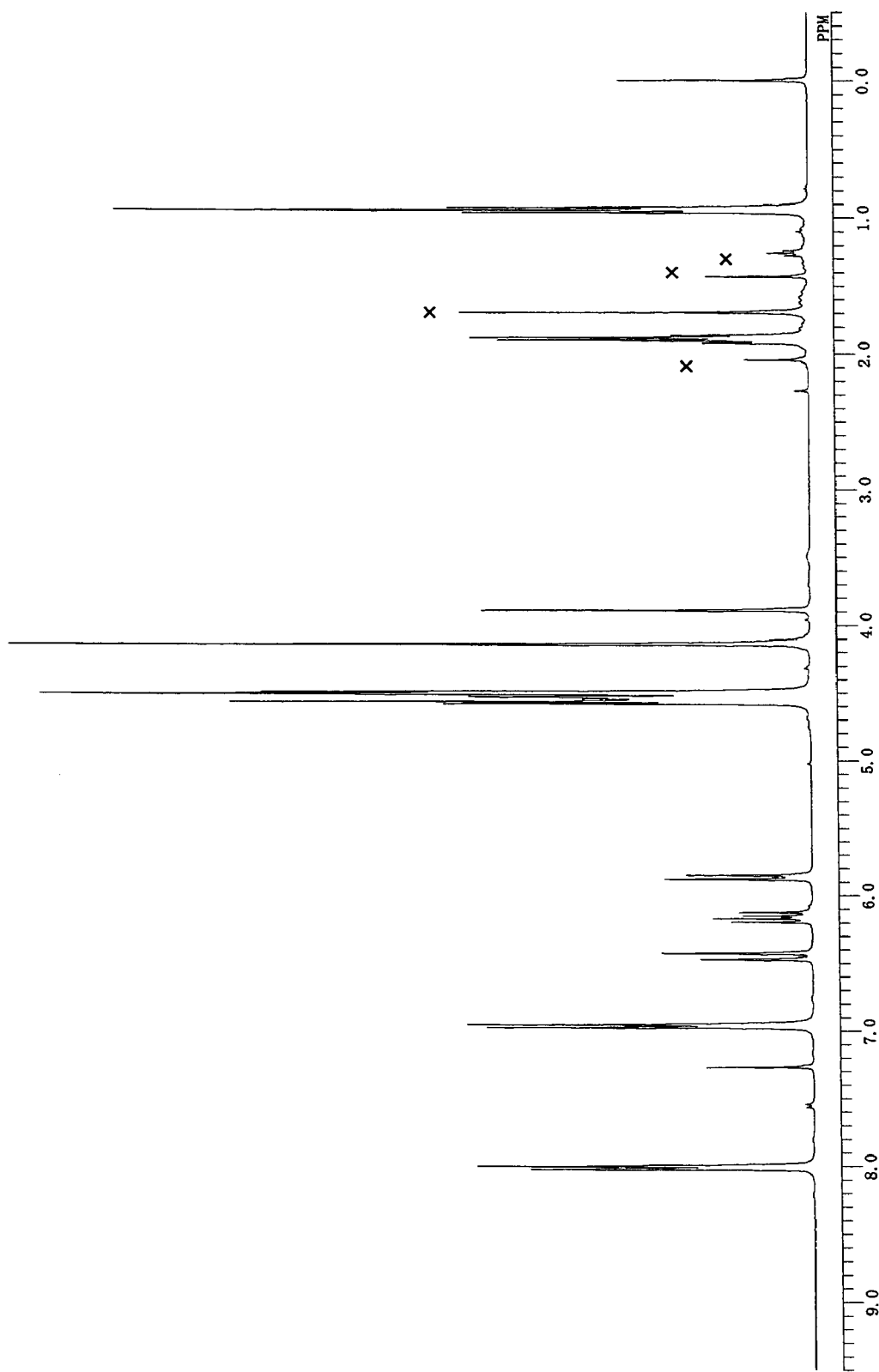
FIG. 2 shows the ¹H-NMR spectrum of acrylic compound 2 obtained in Reference Example 2.

The $^1$H-NMR spectrum of acrylic compound 2 is shown in FIG. 2.

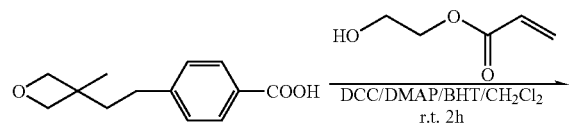

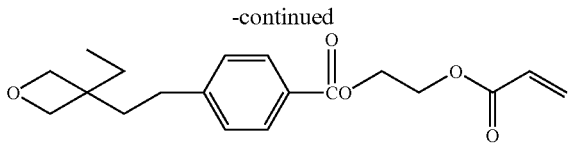

Reference Example 3

Synthesis of Acrylic Compound 3 Having No Oxetanyl Group

In accordance with the scheme below, an acrylic compound having no oxetanyl group (acrylic compound 3) was synthesized.

Figure 3:
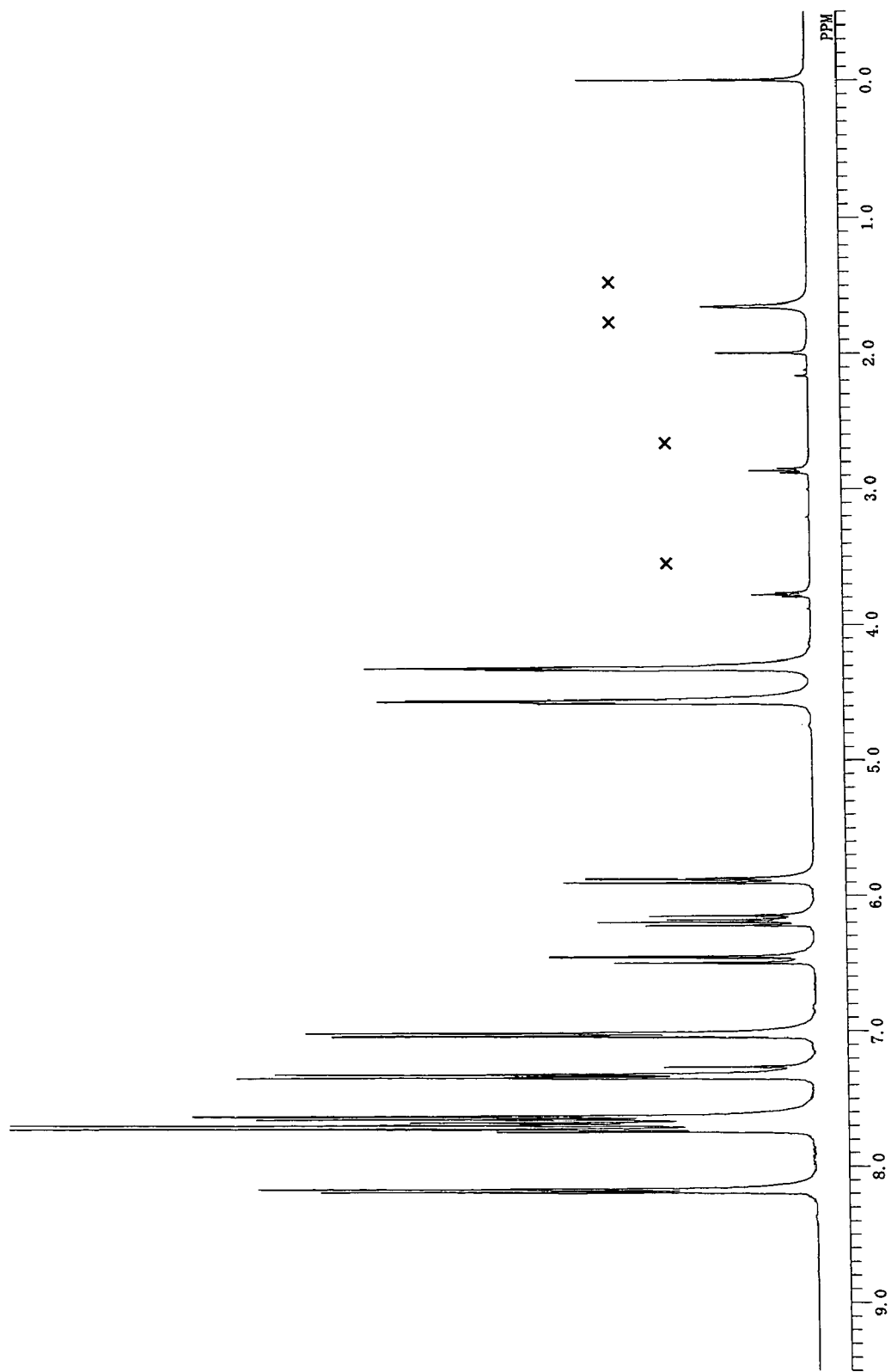
FIG. 3 shows the ¹H-NMR spectrum of acrylic compound 3 obtained in Reference Example 3.

The $^1$H-NMR spectrum of acrylic compound 3 is shown in FIG. 3.

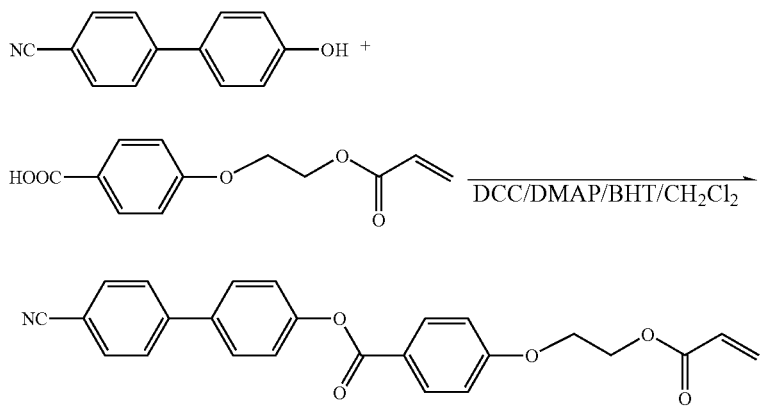

Reference Example 4

Figure 4:
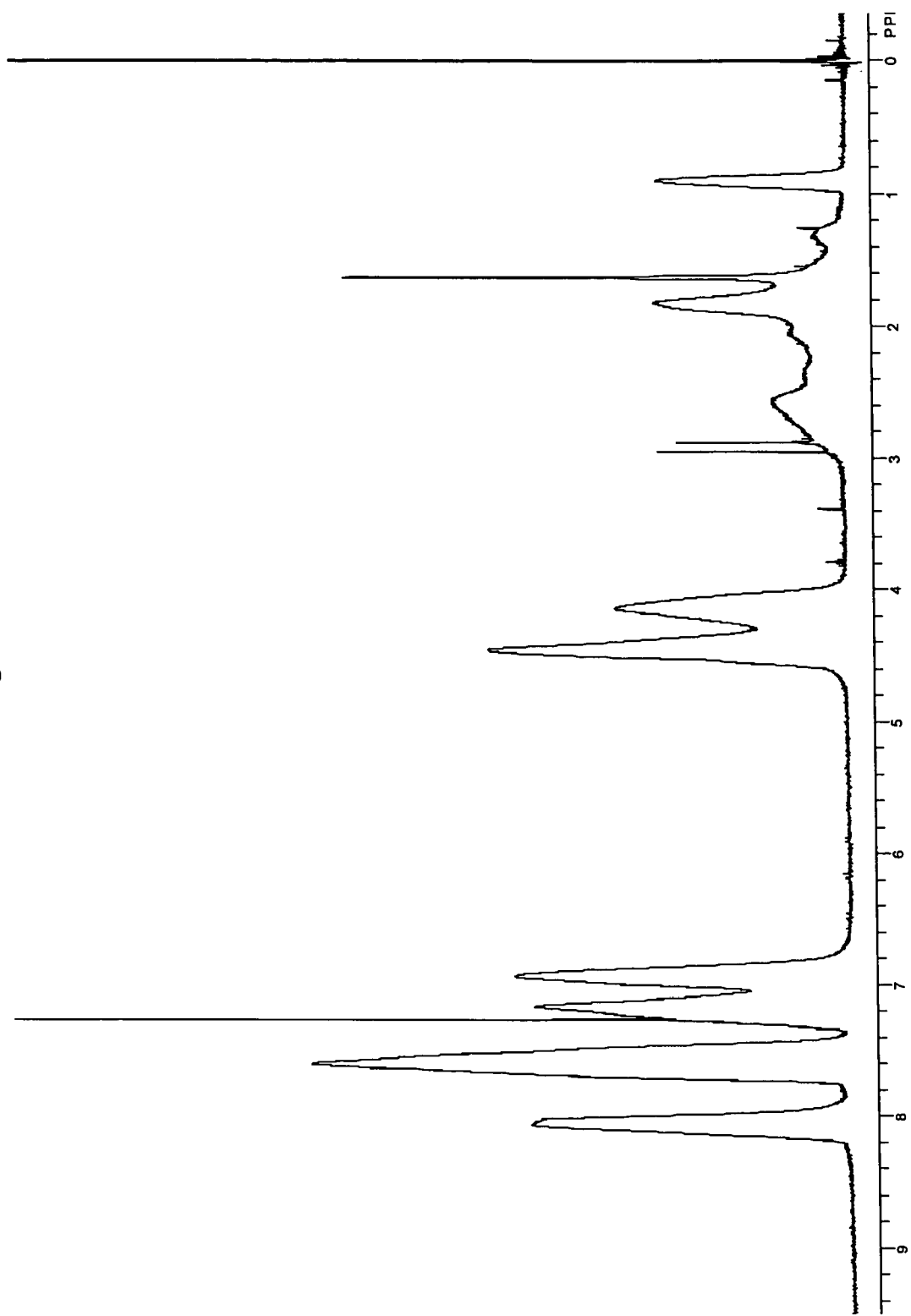
FIG. 4 shows the ¹H-NMR spectrum of side chain-type liquid crystalline polyacrylate 4 obtained in Reference Example 4.

Synthesis of Side Chain-type Liquid Crystalline Polyacrylate 4 Having an Oxetanyl Group 2.5 parts (molar ratio) of acrylic compound 1 having an oxetanyl group and 7.5 parts (molar ratio) of acrylic compound 3 having no oxetanyl group were radical-polymerized using 2,2'-azobisisobutylonitrile as an initiator and DMF as a solvent under a nitrogen atmosphere at a temperature of 90° C. for 6 hours and reprecipitated with methanol for purification thereby obtaining a side chain-type liquid crystalline polyacrylate having an oxetanyl group (polyacrylate 4). The $^1$H-NMR spectrum of polyacrylate 4 is shown in FIG. 4.

The GPC measurement revealed that the weight-average molecular weight of polyacrylate 4 was 11,800.

The DSC measurement revealed that the Tg was 76° C. From the Mettler observation, it was confirmed that polyacrylate 4 exhibited a liquid crystal phase at a temperature equal to or higher than the Tg and the nematic-isotropic transition temperature was 250° C. or higher.

Reference Example 5

Figure 5:
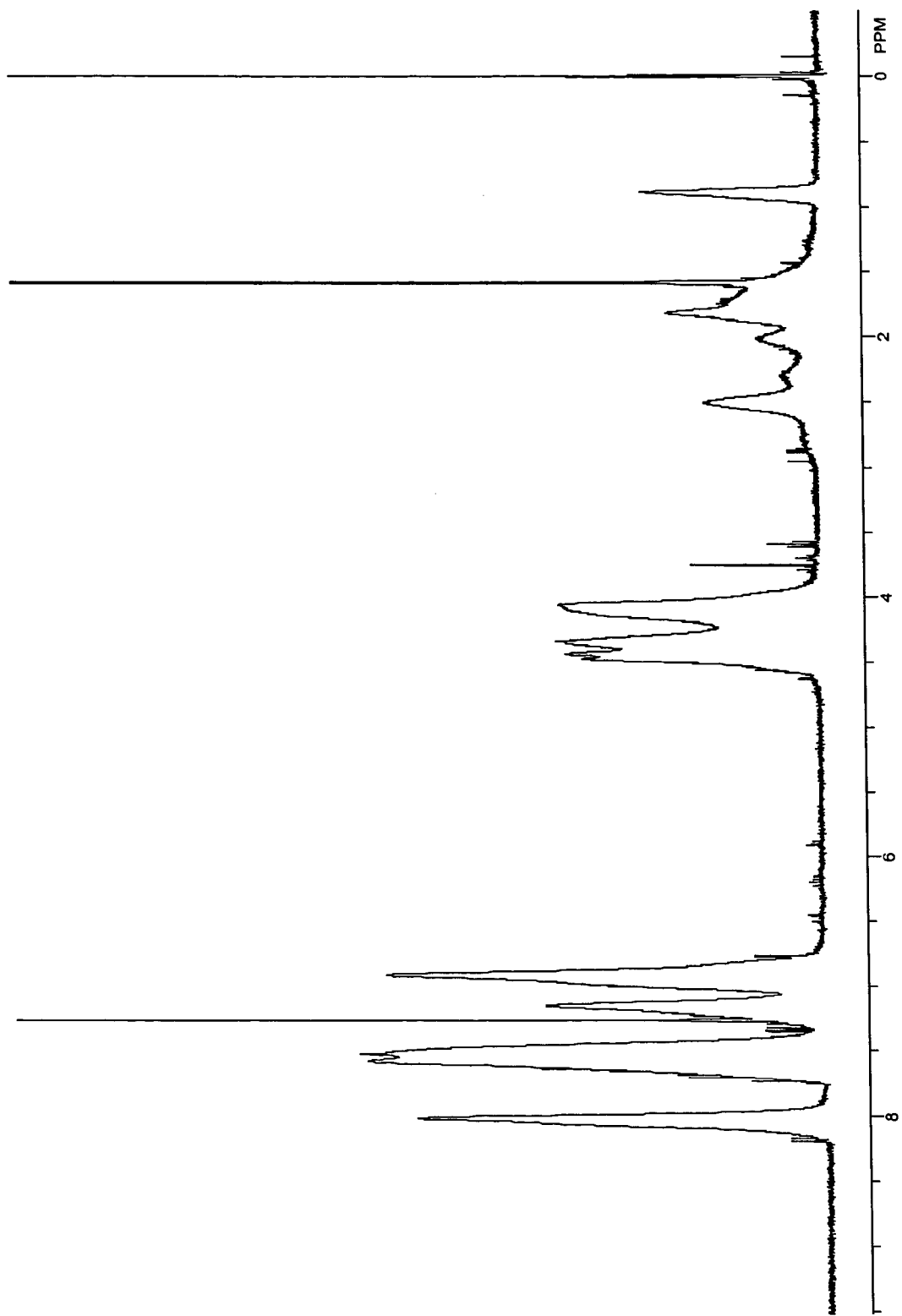
FIG. 5 shows the $^1$H-NMR spectrum of side chain-type liquid crystalline polyacrylate 5 obtained in Reference Example 5.

Synthesis of Side Chain-type Liquid Crystalline Polyacrylate 5 Having an Oxetanyl Group 2 parts (molar ratio) of acrylic compound 1 having an oxetanyl group and 8 parts (molar ratio) of acrylic compound 3 having no oxetanyl group were radical-polymerized using 2,2'-azobisisobutylonitrile as an initiator and DMF as a solvent under a nitrogen atmosphere at a temperature of 60° C. for 8 hours and reprecipitated with methanol for purification thereby obtaining a side chain-type liquid crystalline polyacrylate having an oxetanyl group (polyacrylate 5). The $^1$H-NMR spectrum of polyacrylate 5 is shown in FIG. 5.

The GPC measurement revealed that the weight-average molecular weight of polyacrylate 5 was 23,600.

The DSC measurement revealed that the Tg was 82° C. From the Mettler observation, it was confirmed that polyacrylate 5 exhibited a liquid crystal phase at a temperature equal to or higher than the Tg and the nematic-isotropic transition temperature was 250° C. or higher.

Reference Example 6

Figure 6:
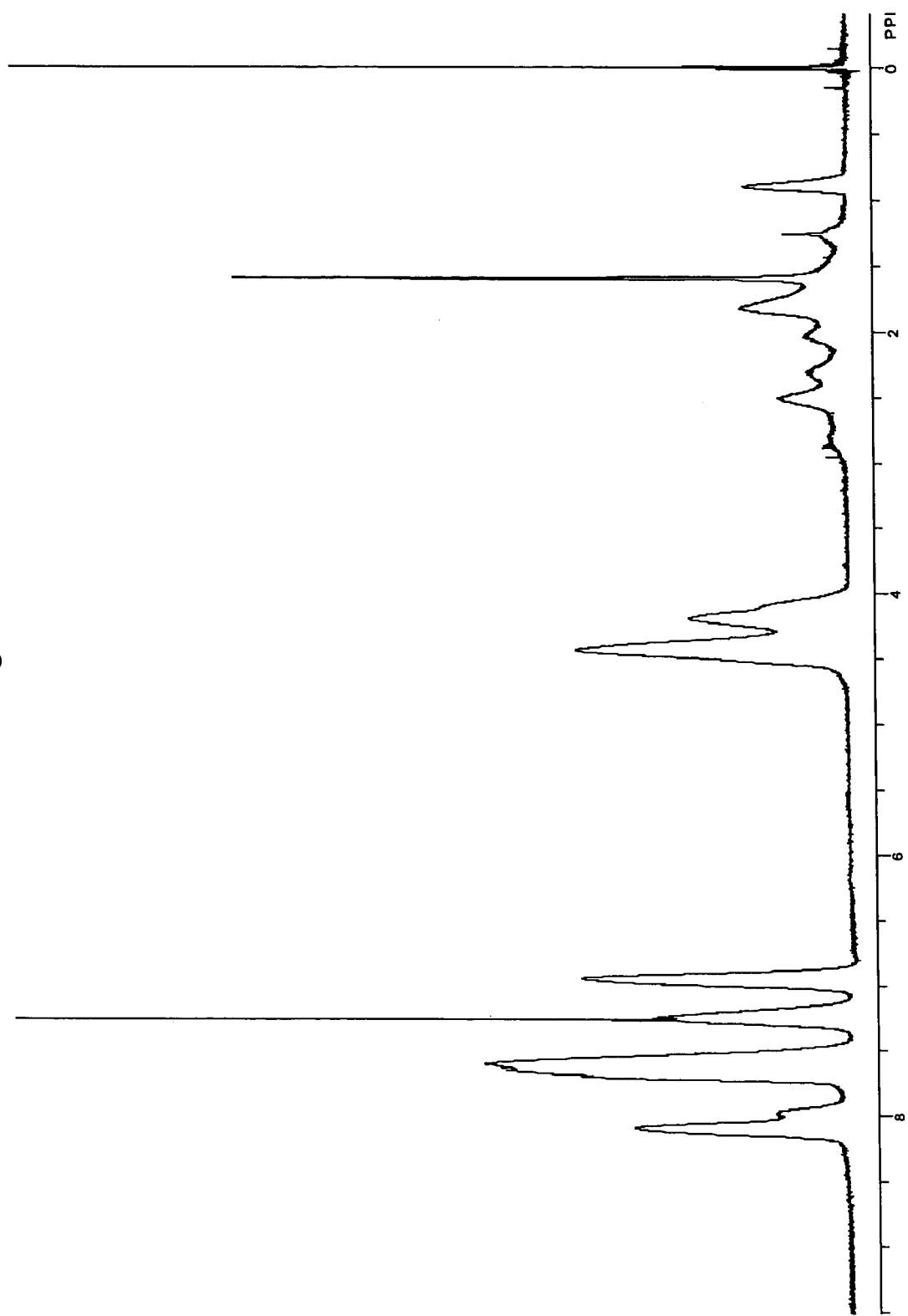
FIG. 6 shows the $^1$H-NMR spectrum of side chain-type liquid crystalline polyacrylate 6 obtained in Reference Example 6.

Synthesis of Side Chain-type Liquid Crystalline Polyacrylate 6 Having an Oxetanyl Group 2.5 parts (molar ratio) of acrylic compound 2 having an oxetanyl group and 7.5 parts (molar ratio) of acrylic compound 3 having no oxetanyl group were radical-polymerized using 2,2'-azobisisobutylonitrile as an initiator and DMF as a solvent under a nitrogen atmosphere at a temperature of 110° C. for 4 hours and reprecipitated with methanol for purification thereby obtaining a side chain-type liquid crystalline polyacrylate having an oxetanyl group (polyacrylate 6). The $^1$H-NMR spectrum of polyacrylate 6 is shown in FIG. 6.

The GPC measurement revealed that the weight-average molecular weight of polyacrylate 6 was 5,600.

The DSC measurement revealed that the Tg was 68° C. From the Mettler observation, it was confirmed that the polyacrylate exhibited a liquid crystal phase at a temperature equal to or higher than the Tg and the nematic-isotropic transition temperature was 200° C.

Reference Example 7

Figure 7:
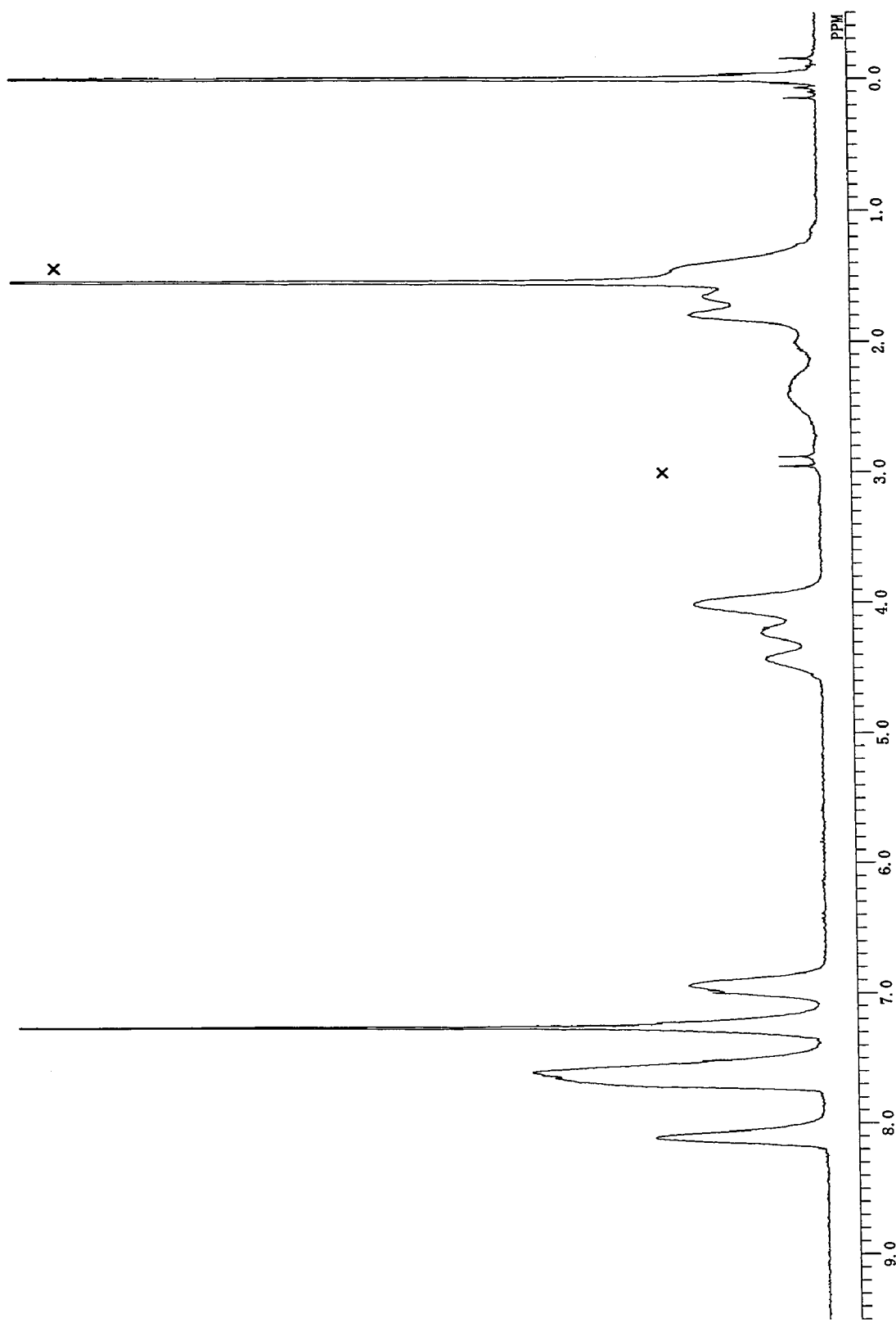
FIG. 7 shows the $^1$H-NMR spectrum of side chain-type liquid crystalline polyacrylate 7 obtained in Reference Example 7.

Synthesis of Side Chain-type Liquid Crystalline Polyacrylate 7 Having No Oxetanyl Group Acrylic compound 3 having no oxetanyl group was radical-polymerized using 2,2'-azobisisobutylonitrile as an initiator and DMF as a solvent under a nitrogen atmosphere at a temperature of 90° C. for 6 hours and reprecipitated with methanol for purification thereby obtaining a side chain-type liquid crystalline polyacrylate having no oxetanyl group (polyacrylate 7). The $^1$H-NMR spectrum of polyacrylate 7 is shown in FIG. 7.

The GPC measurement revealed that the weight-average molecular weight of polyacrylate 7 was 6,600.

The DSC measurement revealed that the Tg was 74° C. From the Mettler observation, it was confirmed that polyacrylate 7 exhibited a nematic phase at a temperature equal to or higher than the Tg and the nematic-isotropic transition temperature was 250° C. or higher.

Reference Example 8

Synthesis of Difunctional Oxetane Monomer 8

Figure 8:
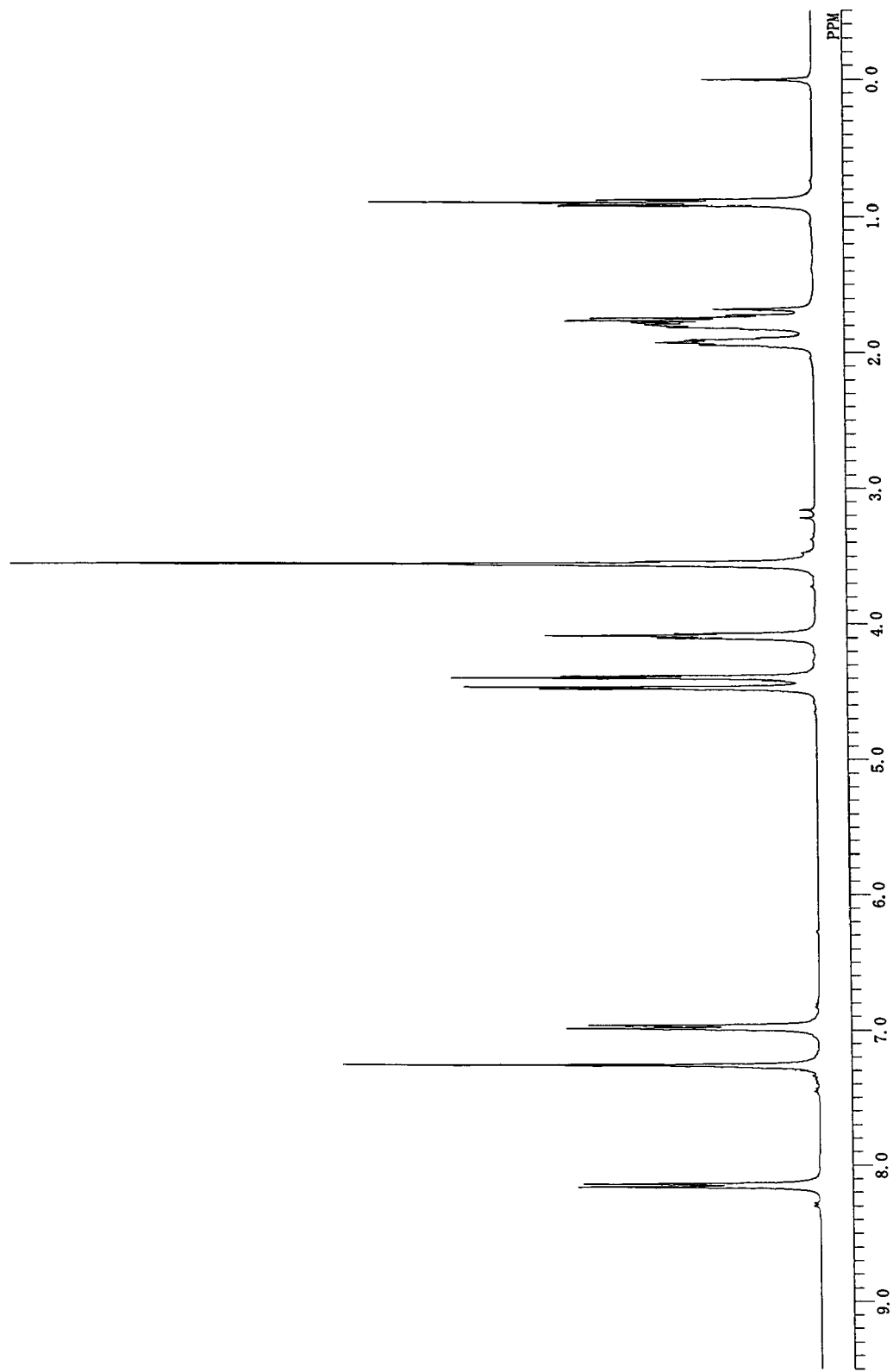
FIG. 8 shows the $^1$H-NMR spectrum of difunctional oxetane monomer 8 obtained in Reference Example 8.

In accordance with the scheme below, difunctional oxetane monomer 8 was synthesized. The $^1$H-NMR spectrum of difunctional oxetane monomer 8 is shown in FIG. 8.

From the DSC measurement and Mettler observation, it was found that the monomer exhibited the phase behavior represented by "crystal-69° C.-nematic phase-95° C.-isotropic phase".

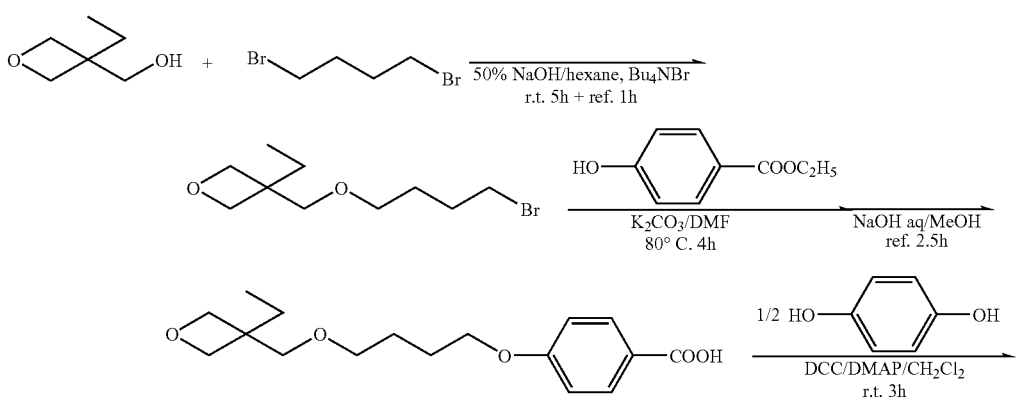

-continued

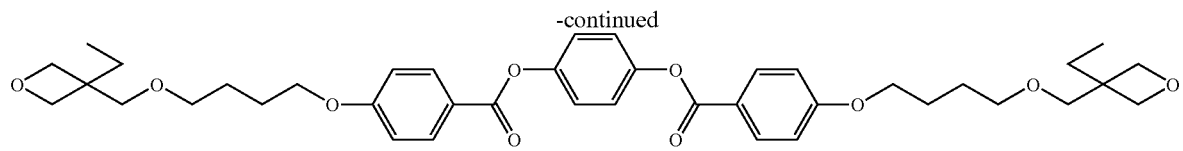

Example 1

Preparation of a Liquid Crystal Film Using Side Chain-type Liquid Crystalline Polyacrylate 4 Having an Oxetanyl Group 0.8 g of polyacrylate 4 synthesized in Reference Example 4 and 0.2 g of difunctional oxetane monomer 8 synthesized in Reference Example 8 were dissolved in 9 ml of cyclohexane. To the solution was added in a dark place 0.05 g of a propylene carbonate solution with 50% triarylsulfoniumhexafluoroantimonate (a reagent manufactured by Aldrich Co.). The mixed solution was filtered to remove the insolubles with a polytetrafluoroethylene filter with a pore size of 0.45 µm thereby preparing a solution of a liquid crystal material.

The resulting solution was spin-coated over a 100 µm thickness polyethylene naphthalate (PEN) film "Teonex" manufactured by TEIJIN Limited whose surface had been subjected to a rubbing treatment with a rayon cloth and then dried on a hot plate kept at 55° C. After the resulting liquid crystal layer on the PEN film was heated at a temperature of 150° C. for 5 minutes, the layer was irradiated with an ultraviolet light of an integrated irradiation dose of 600 mJ/cm² from a high-pressure mercury lamp under an air atmosphere while heating the layer at a temperature of 100° C., and then cooled thereby obtaining a cured liquid crystal layer.

Since the PEN film used as a substrate is large in birefringence and thus not preferred as an optical film, the resulting liquid crystal layer was transferred via an ultraviolet curing-type adhesive "UV-1394" manufactured by Toagosei Co., Ltd. onto a triacetylcellulose (TAC) film thereby obtaining an optical film. More specifically, UV-1394 with a thickness of 5 µm was coated over the cured liquid crystal layer on the PEN film and laminated with a TAC film. After the laminate was subjected to an irradiation of ultraviolet light of 600 mJ/cm² from the TAC film side so as to cure the adhesive, the PEN film (substrate) was released thereby obtaining an optical film.

As a result of observations of the resulting optical film using a polarizing microscope, it was confirmed that it exhibited a monodomain uniform nematic hybrid liquid crystal orientation having no disclination, and the retardation viewed from the front was 111 nm. The retardation viewed from a direction obliquely at an angle of 40 degrees from the vertical along the rubbing axis was 131 nm, while that from the opposite angle, i.e., −40 degrees was 64 nm and was asymmetric to the 40 degree retardation. Furthermore, there was no point wherein the retardation was 0 nm at any angle. From these observations, it was found that the film exhibited a nematic hybrid orientation structure.

Furthermore, only the liquid crystal material portion was scrapped off and measured for the glass transition temperature using a DSC. As a result, the Tg was not observed.

The optical film was laminated via a non-carrier tacky adhesive onto a 2 mm thickness sodalime glass plate. Over the film was laminated a polarizer (SQW-862 manufactured by Sumitomo Chemical Co., Ltd.) such that the rubbing axis of the liquid crystal layer is aligned with the absorption axis of the polarizer. This sample was observed through the polarizer on a backlight and found to be a uniform film. After the sample was kept in a thermostat whose temperature was set at 100° C., for 24 hours, it was taken out therefrom and similarly observed. As a result, any particular change or disorder in the liquid crystal orientation was not observed.

The pencil hardness of the liquid crystal layer surface of the film was on the order of 2H and thus it was confirmed that the film had a sufficient hardness. As described above, it was found that the use of polyacrylate 4 made it possible to produce a film which exhibited an excellent liquid crystal alignability and was improved in thermal stability and strength after fixing the liquid crystal orientation.

Example 2

Preparation of a Liquid Crystal Film Using Side Chain-type Liquid Crystalline Polyacrylate 5 Having an Oxetanyl Group 0.8 g of polyacrylate 5 synthesized in Reference Example 5 and 0.2 g of difunctional oxetane monomer 8 synthesized in Reference Example 8 were dissolved in 9 ml of ethylmethyl ketone. To the solution were added in a dark place 0.04 g of a propylene carbonate solution with 50% triarylsulfoniumhexafluorophosphonate (a reagent manufactured by Aldrich Co.) and 0.01 g of 2,4-diethyl-9H-thioxanthen-9-one (a reagent manufactured by Aldrich Co.). The mixed solution was filtered to remove the insolubles with a polytetrafluoroethylene filter with a pore size of 0.45 µm thereby preparing a solution of a liquid crystal material.

The solution was spin-coated over a 100 µm thickness polyimide film "KAPTON" manufactured by Du Pont Co., whose surface had been subjected to a rubbing treatment with a cotton cloth, and then dried on a hot plate kept at 55° C. After the resulting liquid crystal layer on the polyimide film was heated at a temperature of 170° C. for 5 minutes, the layer was irradiated with an ultraviolet light of an integrated irradiation dose of 150 mJ/cm² from a high-pressure mercury lamp under an air atmosphere while heating the layer at a temperature of 100° C. and then cooled thereby obtaining a cured liquid crystal layer.

Since the polyimide film used as a substrate was brown and thus not preferred as an optical film, the resulting liquid crystal layer was transferred via an ultraviolet curing-type adhesive "UV-1394" manufactured by Toagosei Co., Ltd. onto a triacetylcellulose (TAC) film thereby obtaining an optical film. More specifically, UV-1394 with a thickness of 5 µm was coated over the cured liquid crystal layer on the polyimide film and laminated with a TAC film. After the laminate was subjected to an irradiation of ultraviolet light of 600 mJ/cm² from the TAC film side so as to cure the adhesive, the polyimide film (substrate) was released thereby obtaining an optical film.

As a result of observations of the resulting optical film using a polarizing microscope, it was confirmed that it exhibited a monodomain uniform nematic liquid crystal orientation having no disclination and the retardation viewed from the front was 265 nm. The retardations viewed from directions obliquely along the rubbing axis was symmetric about the vertical direction. From these observations, it was found that the film exhibited a nematic orientation structure.

Furthermore, only the liquid crystal material portion was scrapped off and measured for the glass transition temperature using the DSC. As a result, the Tg was not observed.

The optical film was laminated via a non-carrier tacky adhesive onto a 2 mm thickness sodalime glass plate. Over the film was laminated a polarizer (SQW-862 manufactured by Sumitomo Chemical Co., Ltd.) such that the rubbing axis of the liquid crystal layer is aligned with the absorption axis of the polarizer. This sample was observed through the polarizer on a backlight and found to be a uniform film. After the sample was kept in a thermostat whose temperature was set at 90° C., for 24 hours, it was removed therefrom and similarly observed. As a result, any particular change or disorder in the liquid crystal orientation was not observed.

The pencil hardness of the liquid crystal layer surface of the film was on the order of 2H and thus it was confirmed that the film had a sufficient hardness. As described above, it was found that the use of polyacrylate 5 made it possible to produce a film which was aligned excellently in a liquid crystal orientation state and improved in thermal stability and strength after fixing the liquid crystal orientation.

Example 3

Preparation of a Liquid Crystal Film Using Side Chain-Type Liquid Crystalline Polyacrylate 6 Having an Oxetanyl Group 0.8 g of polyacrylate 6 synthesized in Reference Example 6 and 0.2 g of difunctional oxetane monomer 8 synthesized in Reference Example 8 were dissolved in 9 ml of cyclohexane. To the solution was added in a dark place 0.05 g of a propylene carbonate solution with 50% triarylsulfonium-hexafluoroantimonate (a reagent manufactured by Aldrich Co.). The mixed solution was filtered to remove the insolubles with a polytetrafluoroethylene filter with a pore size of 0.45 µm thereby preparing a solution of a liquid crystal material.

The resulting solution was spin-coated over a 100 µm thickness polyethylene terephthalate (PET) film "Lumirror" manufactured by Toray Industries, Inc. whose surface had been subjected to a rubbing treatment with a rayon cloth and then dried on a hot plate kept at 60° C. The resulting liquid crystal layer on the PET film was irradiated with an ultraviolet light of an integrated irradiation dose of 600 mJ/cm$^2$ from a high-pressure mercury lamp under an air atmosphere while heating the layer at a temperature of 130° C. and then cooled thereby obtaining a cured liquid crystal layer.

Since the PET film used as a substrate is large in birefringence and thus not preferred as an optical film, the resulting film was transferred via an ultraviolet curing-type adhesive "UV-1394" manufactured by Toagosei Co., Ltd. onto a triacetylcellulose (TAC) film thereby obtaining an optical film. More specifically, UV-1394 with a thickness of 5 µm was coated over the cured liquid crystal layer on the PET film and laminated with a TAC film. After the laminate was subjected to an irradiation of ultraviolet light of 600 mJ/cm$^2$ from the TAC film side so as to cure the adhesive, the PET film (substrate) was released thereby obtaining an optical film.

As a result of observations of the resulting optical film using a polarizing microscope, it was confirmed that it exhibited a monodomain uniform nematic hybrid liquid crystal orientation having no disclination and the retardation viewed from the front was 95 nm. The retardation viewed from a direction obliquely at an angle of 40 degrees from the vertical along the rubbing axis was 128 nm, while that from the opposite angle, i.e., −40 degrees was 45 nm and was asymmetric to the 40 degree retardation. Furthermore, there was no point wherein the retardation was 0 nm at any angle. From these observations, it was found that the film exhibited a nematic hybrid orientation structure.

Furthermore, only the liquid crystal material portion was scrapped off and measured for the glass transition temperature using a DSC. As a result, the Tg was not observed.

The optical film was laminated via a non-carrier tacky adhesive onto a 2 mm thickness sodalime glass plate. Over the film was laminated a polarizer (SQW-862 manufactured by Sumitomo Chemical Co., Ltd.) such that the rubbing axis of the liquid crystal layer is aligned with the absorption axis of the polarizer. This sample was observed through the polarizer on a backlight and found to be a uniform film. After the sample was kept in a thermostat whose temperature was set at 100° C., for 24 hours, it was taken out therefrom and similarly observed. As a result, any particular change or disorder in the liquid crystal orientation was not observed.

The pencil hardness of the liquid crystal layer surface of the film was on the order of 2H and thus it was confirmed that the film had a sufficient hardness. As described above, it was found that the use of polyacrylate 6 made it possible to produce a film which was aligned excellently in a liquid crystal orientation state and improved in thermal stability and strength after fixing the liquid crystal orientation.

Example 4

Figure 9:
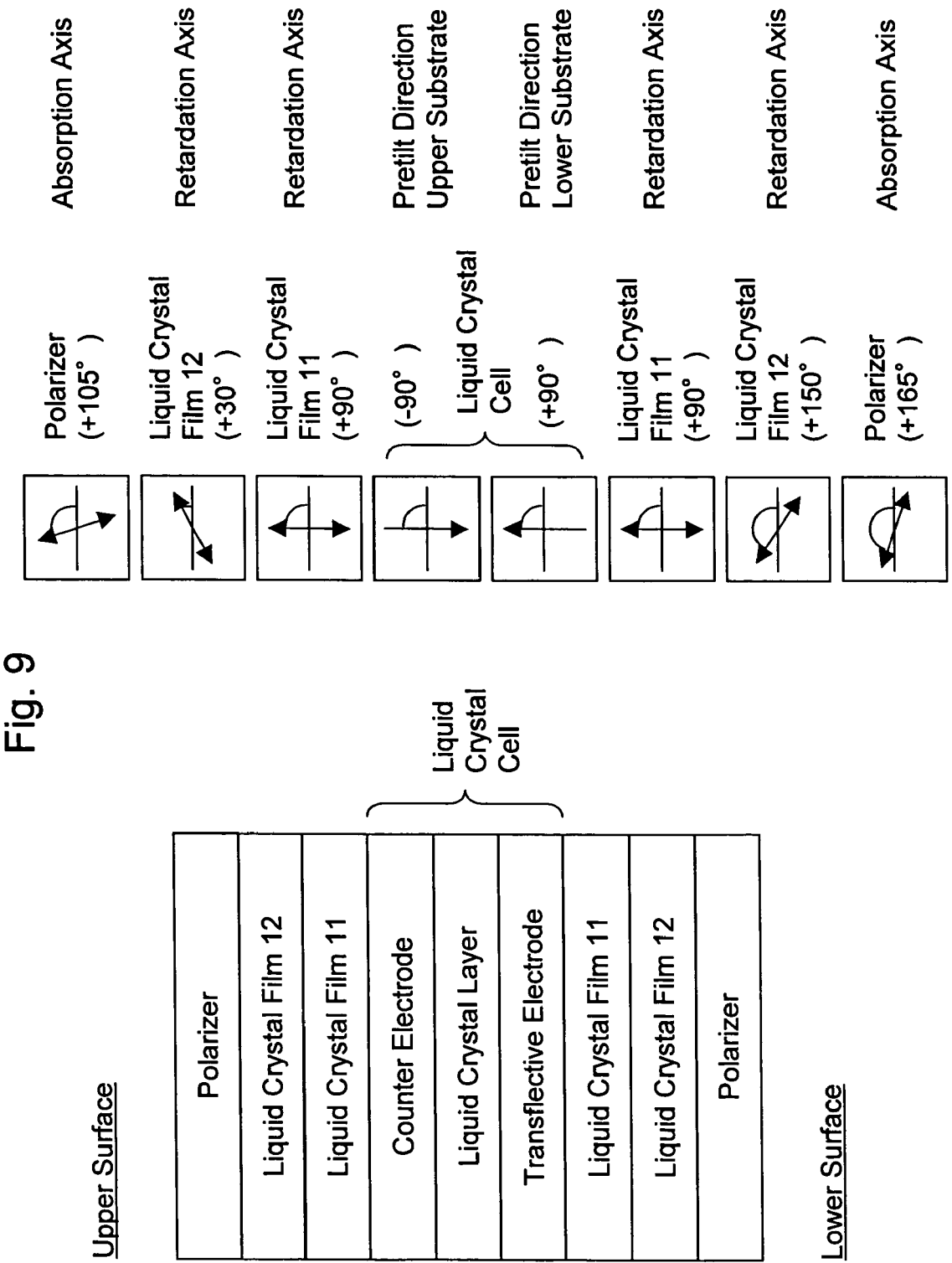
FIG. 9 schematically shows the axes arrangement in the liquid crystal display device used in Example 4.

The optical film with a retardation of 111 nm obtained in Example 1 (hereinafter referred to as "liquid crystal film 11") and the optical film with a retardation of 265 nm obtained in Example 2 (hereinafter referred to as "liquid crystal film 12") were used in combination as a wide bandwidth λ/4 plate and assembled with a transflective TFT-ECB-type liquid crystal cell with a reflector thereby producing a liquid crystal display device with the arrangement shown in FIG. 9. The liquid crystal cell contained ZLI-1695 manufactured by Merck Ltd. as a liquid crystal material which had been formed into a homogenously-aligned liquid crystal layer with a thickness of 5 µm. The pretilt angle at the cell interface was 2 degrees, while the Δnd of the liquid crystal cell was 310 nm. As a polarizer, SQW-862 manufactured by Sumitomo Chemical Co., Ltd. was used.

As a result, it was confirmed that CR=10, i.e., an excellent white and black display was achieved.

Comparative Example 1

Preparation of Liquid Crystal Film Using Side Chain-type Liquid Crystalline Polyacrylate 7

1 g of polyacrylate 7 synthesized in Reference Example 7 was dissolved in 9 ml of cyclohexane and filtered to remove the insolubles with a polytetrafluoroethylene filter with a pore size of 0.45 µm thereby preparing a solution of a liquid crystal material.

The resulting solution was spin-coated over a 50 µm thickness polyethylene naphthalate (PEN) film "Teonex"

manufactured by TEIJIN Limited, whose surface had been subjected to a rubbing treatment with a rayon cloth, and then dried on a hot plate kept at 60° C. The resulting liquid crystal layer on the PEN film was heated at a temperature of 150° C. for 5 minutes and then quenched to room temperature, thereby obtaining a liquid crystal layer.

Since the PEN film used as a substrate is large in birefringence and thus not preferred as an optical film, the resulting film was transferred via an ultraviolet curing-type adhesive "UV-1394" manufactured by Toagosei Co., Ltd. onto a triacetylcellulose (TAC) film thereby obtaining an optical film. More specifically, UV-1394 with a thickness of 5 μm was coated over the cured liquid crystal layer on the PEN film and laminated with a TAC film. After the laminate was subjected to an irradiation of ultraviolet light of 400 mJ/cm$^2$ from the TAC film side so as to cure the adhesive, the PEN film (substrate) was released thereby obtaining an optical film.

As a result of observations of the resulting optical film using a polarizing microscope, it was confirmed that it exhibited a monodomain uniform nematic liquid crystal orientation having no disclination and the retardation was 100 nm. However, only the liquid crystal material portion was scrapped off and measured for the glass transition temperature using a DSC. As a result, the Tg was 80° C. which was low. The pencil hardness of the liquid crystal layer surface of the film was on the order of B and thus it was confirmed that the film was too soft to be used as an optical film.

The film was laminated via a non-carrier tacky adhesive onto a 2 mm thickness sodalime glass plate and over the film was laminated a polarizer (SQW-862 manufactured by Sumitomo Chemical Co., Ltd.) such that the rubbing axis of the liquid crystal layer is aligned with the absorption axis of the polarizer. This sample was observed through the polarizer on a backlight and found to be a uniform film. After the sample was kept in a thermostat whose temperature was set at 80° C., for 24 hours, it was removed therefrom and similarly observed. It was found that the film had voids at peripheries due to the disordered liquid crystal orientation.

Example 5

Figure 10:
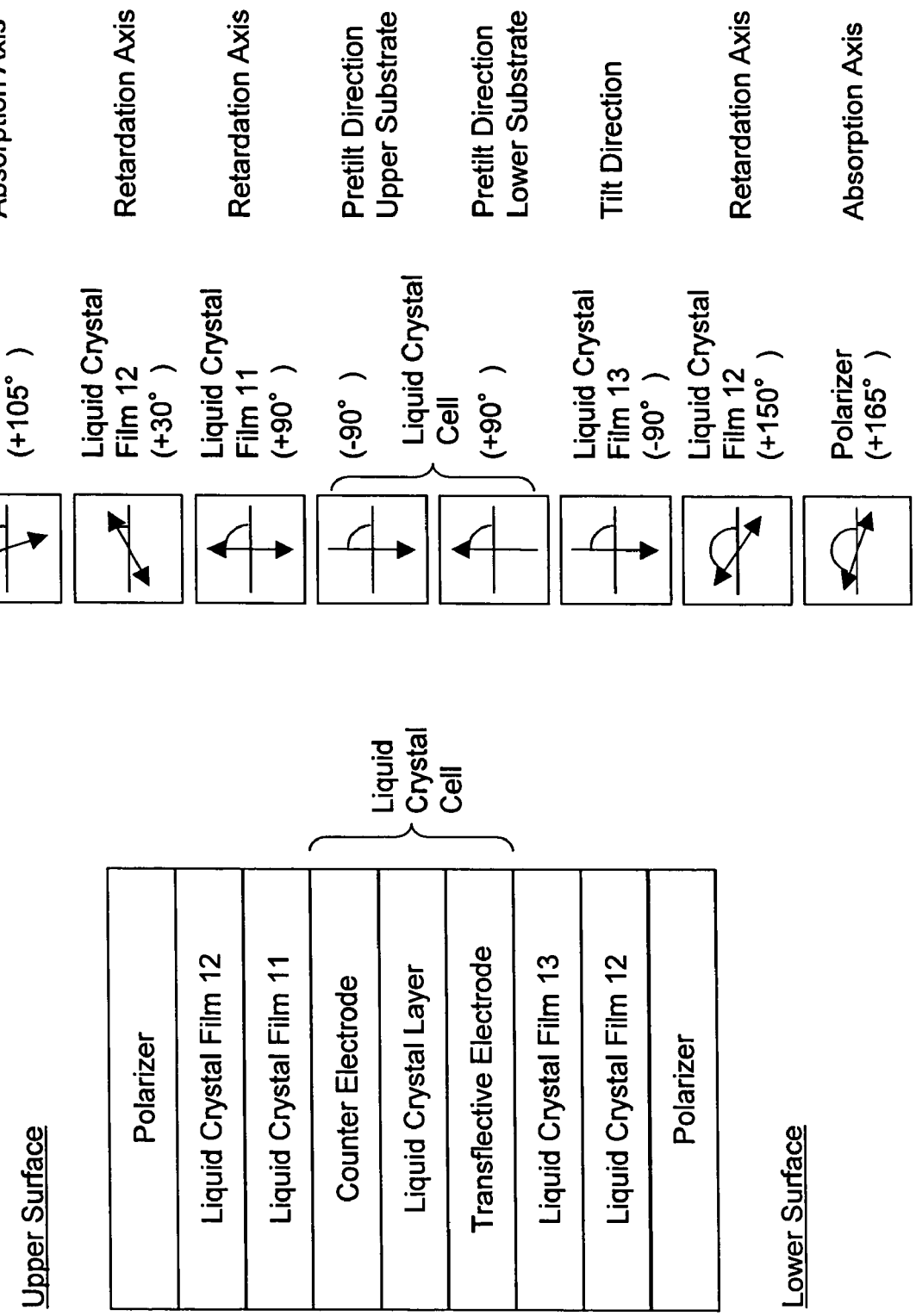
FIG. 10 schematically shows the axes arrangement in the liquid crystal display device used in Example 5.

A wide bandwidth λ/4 plate was formed with the optical film with a front retardation of 111 nm obtained in Example 1 (liquid crystal film 11), the optical film with a front retardation of 265 nm obtained in Example 2 (liquid crystal film 12), and an optical film with a front retardation of 111 nm obtained by changing the thickness of the liquid crystal layer of the optical film of Example 2 (liquid crystal film 13) and assembled with a TFT-transflective ECB-type liquid crystal cell with a reflector thereby producing a liquid crystal display device with the arrangement shown in FIG. 10. The liquid crystal cell contained ZLI-1695 manufactured by Merck Ltd. as a liquid crystal material which had been formed into a homogenously-aligned liquid crystal layer with a thickness of 5 μm. The pretilt angle at the cell interface was 2 degrees, while the α nd of the liquid crystal cell was 310 nm. As a polarizer, SQW-862 manufactured by Sumitomo Chemical Co., Ltd. was used.

As a result, it was confirmed that CR=9, i.e., an excellent white and black display was achieved. Furthermore, it was also confirmed that a wider viewing angle was able to be obtained with this display than that of Example 4.

What is claimed is:

1. A liquid crystal film obtained by fixing an aligned structure of a liquid crystal material containing at least a side chain polymeric liquid crystalline substance obtained by copolymerizing the (meth)acrylic portion of a (meth)acrylic compound having an oxetanyl group represented by formula (1) below with another (meth)acrylic compound and a difunctional low molecular weight liquid crystalline substance having two oxetanyl groups represented by formula (2):

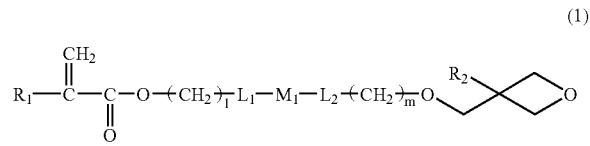

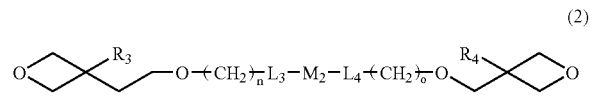

wherein $R_1$ is hydrogen or methyl; $R_2$, $R_3$, and $R_4$ are each independently selected from the group consisting of hydrogen, methyl, and ethyl; $L_1$, $L_2$, $L_3$, and $L_4$ are each independently selected from the group consisting of a single bond, —O—, —O—CO—, and —CO—O—; $M_1$ and $M_2$ are each independently represented by a formula selected from the group consisting of formulas (3), (4) and (5) below; and l, m, n, and o are each independently an integer from 0 to 10:

wherein $P_1$ and $P_2$ are each independently a group selected from the group consisting of formulas (6) below; $P_3$ is a group selected from the group consisting of formulas (7) below; and $L_5$ and $L_6$ are each independently selected from the group consisting of a single bond, —CH=CH—, —C≡C—, —O—, —O—CO— and CO—O—:

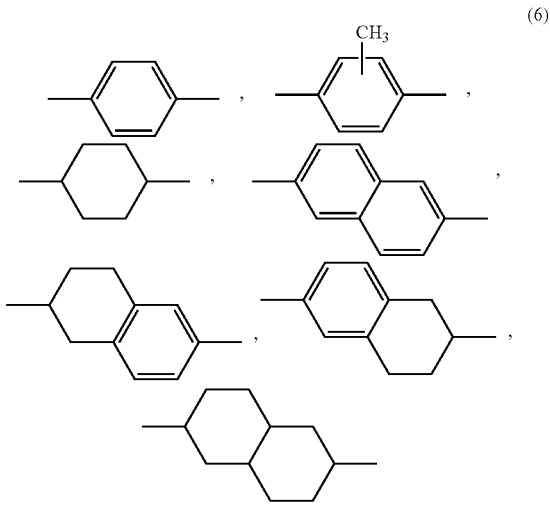

-continued

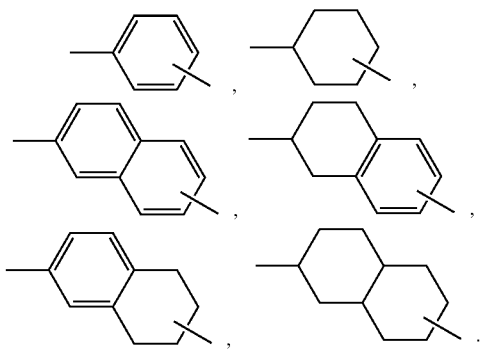
(7)

2. The liquid crystal film according to claim 1 wherein said side chain polymeric liquid crystalline substance contains a unit represented by formula (8) below in an amount of 5 to 100 percent by mol:

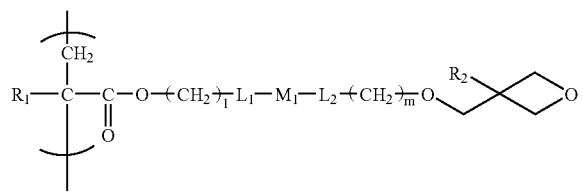
(8)

wherein $R_1$, $R_2$, $L_1$, $L_2$, $M_1$, l and m are the same as those in formula (1).

3. The liquid crystal film according to claim 1 or 2 wherein the weight-average molecular weight of said side chain polymeric crystalline substance is from 2,000 to 100,000.

4. The liquid crystal film according to claim 1 or 2 wherein said liquid crystal material contains said side chain polymeric liquid crystalline substance in an amount of at least 10 percent by mass or more and said difunctional low molecular weight liquid crystalline substance in an amount of at least 5 percent by mass or more.

5. The liquid crystal film according to claim 1 or 2 wherein said liquid crystal material contains a photo-cation generator and/or a thermal-cation generator.

6. The liquid crystal film according to claim 1 or 2 wherein said film is one obtained by developing said liquid crystal material over an alignment substrate so as to be aligned and fixing the liquid crystal material in the aligned state by irradiation with light and/or a heat treatment.

7. The liquid crystal film according to claim 6 herein said liquid crystal material is fixed in an aligned structure selected from the group consisting of nematic, nematic hybrid, and smectic orientations.

8. An optical film comprising the liquid crystal film according to claim 1.

9. The optical film according to claim 8 which is a film selected from the group consisting of a λ/2 film, a λ/4 film, a color compensation film, a retardation film, and a viewing angle improving film.

10. A liquid crystal display device which is quipped with the optical film according to claim 8 or 9.

* * * * *

UNITED STATES PATENT AND TRADEMARK OFFICE
CERTIFICATE OF CORRECTION

PATENT NO. : 7,125,590 B2 Page 1 of 1
APPLICATION NO. : 10/825557
DATED : October 24, 2006
INVENTOR(S) : Takuya Matsumoto et al.

It is certified that error appears in the above-identified patent and that said Letters Patent is hereby corrected as shown below:

COLUMN 28, Between lines 20-25:

should be replaced with

Signed and Sealed this

Twenty-fifth Day of March, 2008

JON W. DUDAS
*Director of the United States Patent and Trademark Office*